(12) United States Patent
Thackeray et al.

(10) Patent No.: US 9,593,024 B2
(45) Date of Patent: Mar. 14, 2017

(54) ELECTRODE STRUCTURES AND SURFACES FOR LI BATTERIES

(71) Applicant: UCHICAGO ARGONNE, LLC, Chicago, IL (US)

(72) Inventors: Michael M. Thackeray, Naperville, IL (US); Sun-Ho Kang, Seoul (KR); Mahalingam Balasubramanian, Naperville, IL (US); Jason Croy, Bolingbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 239 days.

(21) Appl. No.: 14/154,948

(22) Filed: Jan. 14, 2014

(65) Prior Publication Data
US 2014/0127398 A1 May 8, 2014

Related U.S. Application Data

(60) Division of application No. 13/440,431, filed on Apr. 5, 2012, now abandoned, which is a (Continued)

(51) Int. Cl.
*C01D 15/02* (2006.01)
*H01M 4/04* (2006.01)
(Continued)

(52) U.S. Cl.
CPC .......... *C01D 15/02* (2013.01); *H01M 4/0402* (2013.01); *H01M 4/0471* (2013.01);
(Continued)

(58) Field of Classification Search
None
See application file for complete search history.

(56) References Cited

U.S. PATENT DOCUMENTS 5,153,081 A * 10/1992 Thackeray ............. C01G 45/02
423/599
5,316,877 A 5/1994 Thackeray et al.
(Continued)

OTHER PUBLICATIONS

Thackeray et al. (Li2MnO3-stabilized LiMO2 (M=Mn, Ni, Co) electrodes for lithium-ion batteries) Journal of Materials Chemistry. vol. 17, No. 30 Aug. 14, 2007. p. 3112-3125.*
Johnson, C.S. et al., The Significance of the Li2MnO3 Component in Composite xLi2MnO3.(1-x)LiMn0.5Ni0.5O2 Electrodes, Electrochemistry Communications 6, 1085-1091 (2004).
Johnson, C.S. et al., Lithium-Manganese Oxide Electrodes With Layered-Spinel Composite Structures xLi2MnO3•(1-x) Li1+yMn2-yO4 (0<x<1, 0≤y≤0.33) for Lithium Batteries, Electrochemistry Communications 7, 528-536 (2005).
(Continued)

*Primary Examiner* — Patrick Ryan
*Assistant Examiner* — Christopher Domone
(74) *Attorney, Agent, or Firm* — Olson & Cepuritis, Ltd.

(57) ABSTRACT

This invention relates to methods of preparing positive electrode materials for electrochemical cells and batteries. It relates, in particular, to a method for fabricating lithium-metal-oxide electrode materials for lithium cells and batteries. The method comprises contacting a hydrogen-lithium-manganese-oxide material with one or more metal ions, preferably in an acidic solution, to insert the one or more metal ions into the hydrogen-lithium-manganese-oxide material; heat-treating the resulting product to form a powdered metal oxide composition; and forming an electrode from the powdered metal oxide composition.

16 Claims, 18 Drawing Sheets

Related U.S. Application Data continuation-in-part of application No. PCT/US2011/040652, filed on Jun. 16, 2011, which is a continuation-in-part of application No. 13/044,038, filed on Mar. 9, 2011, now abandoned.

(60) Provisional application No. 61/414,561, filed on Nov. 17, 2010.

(51) Int. Cl.
    *H01M 4/131*     (2010.01)
    *H01M 4/36*     (2006.01)
    *H01M 4/505*     (2010.01)

(52) U.S. Cl.
    CPC ........... *H01M 4/131* (2013.01); *H01M 4/366* (2013.01); *H01M 4/505* (2013.01); *Y02E 60/122* (2013.01); *Y02P 70/54* (2015.11)

(56) References Cited

U.S. PATENT DOCUMENTS

| | | | |
|---|---|---|---|
| 5,981,106 | A | 11/1999 | Amine et al. |
| 6,482,374 | B1 | 11/2002 | Kumar et al. |
| 6,677,082 | B2 | 1/2004 | Thackeray et al. |
| 6,680,143 | B2 | 1/2004 | Thackeray et al. |
| 7,314,682 | B2 | 1/2008 | Thackeray et al. |
| 7,468,223 | B2 | 12/2008 | Thackeray et al. |
| 2003/0108790 | A1* | 6/2003 | Manthiram ........... H01M 4/131 429/218.1 |
| 2004/0005265 | A1* | 1/2004 | Chiang ............... H01M 4/5825 423/306 |
| 2009/0136839 | A1 | 5/2009 | Kraznov et al. |
| 2009/0224212 | A1 | 9/2009 | Manthiram et al. |
| 2010/0086853 | A1 | 4/2010 | Venkatachalam et al. |
| 2010/0207577 | A1 | 8/2010 | Sugiyama et al. |

OTHER PUBLICATIONS

Thackeray, M.M. et al., Li2MnO3-Stablized LiMO2 (M=Mn, Ni, Co) Electrodes for Lithium-Ion Batteries, Journal of Materials Chemistry 17, 3112-3125 (2007).

Kim, D. et al., High-Energy and High Power Li Rich Nickel Manganese Oxide Electrode Materials, Electrochemistry Communications 12, 1618-1621 (2010).

Kim, J. et al., Electrochemical and Structural Properties of xLi2M'O3•(1−x)LiMn0.5Ni0.5O2 Electrodes for Lithium Batteries (M'=Ti, Mn, Zr; 0≤x≤0.3), Chemical Materials 16, 1996-2006 (2004).

Gummow, R.J. et al., Improved Capacity Retention in Rechargeable 4 V Lithium/Lithium-Manganese Oxide (Spinel) Cells, Solid State Ionics 69, 59-67 (1994).

Kim, J.S. et al., The Electrochemical Stability of Spinel Electrodes Coated with ZrO2, Al2O3, and SiO2 From Colloidal Suspensions, Journal of the Electrochemical Society 151, (10) A1755-A1761 (2004).

Thackeray, M.M. et a., Advances in Manganese-Oxide Composite Electrodes for Lithium-Ion Batteries, Journal of Materials Chemistry, 15, 2257-2267 (2005).

Amatucci, G. et al., Optimization of Insertion Compounds Such as LiMn2O4 for Li-Ion Batteries, Journal of the Electrochemical Society, 149 (12), K31-K46, (2002).

Choi, W. et al., Superior Capacity Retention Spinel Oxyfluoride Cathodes for Lithium-Ion Batteries, Electrochemical and Solid State Letters, 9 (5), A245-A248 (2006).

Van Der Ven, A. et al., Ordering in Lix(Ni0.5Mn0.5)O2 and Its Relation to Charge Capacity and Electrochemical Behavior in Rechargeable Lithium Batteries, Electrochemistry Communications 6, 1045-1050 (2004).

Johnson, C.S. et al., Anomalous Capacity and Cycling Stability of xLi2MnO3•(1−x)LiMO2 Electrodes (M=Mn, Ni, Co) in Lithium Batteries at 50 •C, Electrochemistry Communications 9, 787-795 (2007).

\* cited by examiner $xLi_2MnO_3 \cdot (1-x)LiMO_2$

ELECTRODE STRUCTURES AND SURFACES FOR LI BATTERIES

CROSS-REFERENCE TO RELATED APPLICATIONS

This application is a division of U.S. patent application Ser. No. 13/440,431, filed on Apr. 5, 2012, which is a continuation-in-part of International Application No. PCT/US2011/040652, filed on Jun. 16, 2011, which is a continuation-in-part of U.S. patent application Ser. No. 13/044,038, filed on Mar. 9, 2011, now abandoned, which claims the benefit of U.S. Provisional Application Ser. No. 61/414,561, filed on Nov. 17, 2010, each of which is incorporated herein by reference in its entirety.

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrode materials for electrochemical cells and batteries. Such cells and batteries are used widely to power numerous devices, for example, portable electronic appliances and medical, transportation, aerospace, and defense systems.

SUMMARY OF THE INVENTION

This invention relates to positive electrode materials (cathodes) for electrochemical cells and batteries. More specifically, the invention relates to lithium-metal-oxide electrode materials, predominantly those having layered-type structures, rock salt-type structures, or spinel-type structures, or combinations or modifications thereof, that contain manganese ions. The invention extends to include lithium-metal-oxide electrode materials with surface protection, for example, with metal-oxide, metal-fluoride or metal-phosphate layers or coatings to protect the electrodes from highly oxidizing potentials in the cells and from other undesirable effects, such as electrolyte oxidation, oxygen loss, and/or dissolution. Such surface protection enhances the surface stability, rate capability and cycling stability of the electrodes of this invention. The invention also extends to electrode precursor materials comprising manganese ions and to methods for fabricating lithium-metal-oxide electrode materials and structures using these precursor materials. The electrodes of this invention can be used either in primary cells and batteries or rechargeable cells and batteries, notably for lithium cells and batteries.

In one aspect, the present invention provides a positive electrode for an electrochemical cell. The electrode is formed by contacting a hydrogen-lithium-manganese-oxide material with one or more metal ions (e.g., in an aqueous or a non-aqueous solution or a solid state reaction) to insert the one or more metal ions into the hydrogen-lithium-manganese-oxide precursor material; heat-treating the resulting product (e.g., at a temperature in the range of about 300 to about 1000° C., preferably about 400 to about 950° C.) to form a powdered metal oxide composition; and forming an electrode from the powdered metal oxide composition (e.g., by casting a composition comprising the metal oxide powder and a binder onto a substrate, such as a metal foil). The hydrogen-lithium-manganese-oxide material preferably has a layered-type structure that comprises hydrogen, lithium, manganese, and oxygen ions, wherein the oxygen ions are preferably arranged in alternating layers forming octahedra and trigonal prisms in the crystal structure of the material. The powdered metal oxide product composition that results from the hydrogen-lithium-manganese-oxide precursor material can have, for example, a layered-type structure, a spinel-type structure, a rock salt-type structure, or an integrated/composite structure, comprising one or more of these structure types.

For this invention, layered compounds and structures refer broadly to lithium metal oxides $LiMO_2$ or substituted derivatives, in which M is one or more metal ions, the structures of which comprise alternating layers of lithium ions interspersed with layers containing other metal ions, M. The layers containing the M metal ions can also contain lithium ions. Typical non-limiting examples of layered materials include $LiCoO_2$ in which layers of lithium ions alternate with layers of cobalt ions in a close-packed oxygen array; and $Li_2MnO_3$ in which layers of lithium alternate with layers of manganese and lithium ions in a close-packed oxygen array. Rock salt compounds and structures refer broadly to metal oxides, MO, in which M is one or more metal ions (including lithium) that have close-packed structures typified, for example by NiO or substituted derivatives thereof. Spinel compounds and structures refer broadly to the family of close-packed lithium metal oxide spinels, $LiM_2O_4$, or substituted derivatives thereof in which M is one or more metal ions, as typified by the spinel system $Li_{1+x}Mn_{2-x}O_4$ ($0 \leq x \leq 0.33$). It is to be understood that, in practice, deviations from ideal crystallographic behavior of these structure types are commonplace, such as variations in composition, in atomic positions and coordination sites within crystal structures, as well as in the site occupancy of atoms and in the structural disorder of atoms on different sites. Such crystallographic deviations and imperfections are therefore necessarily included within the definitions provided above and within the spirit and scope of this invention.

In one embodiment, a positive electrode of the invention is formed from a lithium-manganese-oxide precursor compound that comprises lithium, manganese, and oxygen ions in a layered-type structure wherein lithium ions occupy octahedral sites in lithium-rich layers, and lithium and manganese ions occupy octahedral sites in manganese-rich layers that alternate with the lithium-rich layers within a close-packed oxygen array. In this embodiment, the precursor compound is contacted with an aqueous or non-aqueous solution that contains an acid and the one or more metal ions to be inserted. The formation of the hydrogen-lithium-manganese-oxide material by hydrogen donation from the acid, occurs concurrently with the insertion of the one or more metal ions. Next, the resulting product is heat-treated to form a powdered metal oxide composition, and then an electrode is formed from the powdered metal oxide composition. As described above, the hydrogen-lithium-manganese-oxide precursor material comprises hydrogen, lithium, manganese and oxygen ions, in which the oxygen ions may be arranged in alternating layers of octahedra and trigonal prisms in the crystal structure of the material or, alternatively, in some other packing arrangement of the ions. The extent to which a hydrogen-lithium-manganese-oxide material is formed as an intermediate product from the lithium-manganese-oxide precursor compound during the formation of the powdered metal oxide electrode composition depends on a number of factors, such as the extent of hydrogen ion exchange, the conditions of the processing treatment, and the like. Nevertheless, it is believed that an intermediate hydrogen-lithium-manganese-oxide material plays an important role in effecting ion-exchange reactions and the subsequent formation of the powdered metal oxide electrode composition and structure during its synthesis.

Preferably, the precursor compound comprises $Li_2MnO_3$ or $Li[Li_{1/3}Mn_{2/3}]O_2$. In some preferred embodiments, the $Li_2MnO_3$ precursor is cation or anion deficient. In some preferred embodiments, the first precursor compound also includes up to 25 atom percent of one or more other metal ions, preferably transition metal ions, replacing manganese ions and/or lithium ions in the manganese-rich layer of the material. For example, the one or more other transition metal ions replacing the manganese ions can comprise a Ti ion, a Zr ion, or both.

In the positive electrodes of the present invention the manganese and non-lithium metal ions can be partially disordered between lithium-rich layers and manganese-rich layers.

Preferably, the one or more metal ions utilized in forming a positive electrode of the present invention are selected from an alkali metal ion (e.g., Li, Na, or K), an alkaline earth metal ion (e.g., Mg or Ca), a transition metal ion (e.g., Ti, V, Mn, Fe, Co, Ni, Zr, or Mo), or other suitable metal ions (e.g., Al).

Preferably, the lithium and manganese ions in the hydrogen-lithium-manganese-oxide material are located in oxygen octahedra, while the hydrogen ions may be coordinated to the oxygen ions in some other configuration, for example when the hydrogen ions are located in trigonal prisms defined by the oxygen ions. A preferred hydrogen-lithium-manganese-oxide material comprises $H[Li_{1/3}Mn_{2/3}]O_2$, which can be cation or anion deficient. In some preferred embodiments, the hydrogen-lithium-manganese-oxide material may also include up to 25 atom percent of one or more other metal ions replacing manganese ions and/or lithium ions in the manganese-rich layer of the material. For example, the one or more other metal ions can comprise a transition metal ion such as a Ti ion, a Zr ion, or both. In a preferred embodiment, the one or more metal ions are contacted with the hydrogen-lithium-manganese-oxide material during the formation thereof, as described above.

The powdered metal oxide composition preferably has a disordered or partially disordered structure, and can include stacking faults, dislocations, or a combination thereof. The stacking faults can exist between cubic-closed-packed structures, hexagonal-close-packed structures, trigonal prismatic stacking structures, or a combination thereof.

In some embodiments, individual particles of the powdered metal oxide composition, a surface of the formed electrode, or both, are coated in situ during synthesis, for example, with a metal oxide, a metal fluoride, a metal polyanionic material, or a combination thereof, e.g., at least one material selected from the group consisting of (a) lithium fluoride, (b) aluminum fluoride, (c) a lithium-metal-oxide in which the metal is selected preferably, but not exclusively, from the group consisting of Al and Zr, (d) a lithium-metal-phosphate in which the metal is selected from the group consisting preferably, but not exclusively, of Fe, Mn, Co, and Ni, and (e) a lithium-metal-silicate in which the metal is selected from the group consisting preferably, but not exclusively, of Al and Zr. In a preferred embodiment of the invention, the constituents of the coating, such as the aluminum and fluoride ions of an $AlF_3$ coating, the lithium and phosphate ions of a lithium phosphate coating, or the lithium, nickel and phosphate ions of a lithium-nickel-phosphate coating can be incorporated in the solution that is contacted with the hydrogen-lithium-manganese-oxide material or the lithium-manganese-oxide precursor when forming the electrodes of this invention. Alternatively, as taught hereinafter, the surface may be coated with fluoride ions, for example, using $NH_4F$, in which case, the fluoride ions may substitute for oxygen at the surface or at least partially within the bulk of the electrode structure.

Preferably, the formed positive electrode comprises at least about 50 percent by weight (wt %) of the powdered metal oxide composition, and an electrochemically inert polymeric binder (e.g. polyvinylidene difluoride; PVDF). Optionally, the positive electrode can comprise up to about 40 wt % carbon (e.g., carbon back, graphite, carbon nanotubes, carbon microspheres, carbon nanospheres, or any other form of particulate carbon).

In one preferred embodiment, the present invention, designated herein as "Embodiment A", provides a positive electrode for an electrochemical cell in which the electrode is formed by a method comprising: (a) contacting a hydrogen-lithium-manganese-oxide material with one or more metal ions to insert the one or more metal ions into the hydrogen-lithium-manganese-oxide material; (b) heat-treating the resulting product (e.g., at a temperature in the range of about 300 to about 1000° C.) to form a powdered metal oxide composition; and (c) forming an electrode from the powdered metal oxide composition. The powdered metal oxide composition has a layered-type structure, a spinel-type structure, a rock salt-type structure, or an integrated structure comprising one or more of these structure types. Preferably, the hydrogen-lithium-manganese-oxide material in this embodiment comprises hydrogen, lithium, manganese, and oxygen ions, and the oxygen ions are arranged in alternating layers of octahedra and trigonal prisms in the crystal structure of the material. Preferably, the one or more metal ions are selected from the group consisting of an alkali metal ion, an alkaline earth metal ion, and a transition metal ion (e.g., one or more metal ions are selected from the group of ions consisting of Li, Na, K, Mg, Ca, Ti, V, Mn, Fe, Co, Ni, Zr, Mo and Al ions). In some preferred embodiments, the one or more other transition metal ions comprises a Ti ion, a Zr ion, a Co ion, a Ni ion, or a combination thereof.

If desired, the manganese and non-lithium metal ions in Embodiment A can be partially disordered between lithium-rich layers and manganese-rich layers. The hydrogen-lithium-manganese-oxide material can be layered, with the lithium and manganese ions located in oxygen octahedra and the hydrogen ions located in oxygen trigonal prisms in the layered hydrogen-lithium-manganese-oxide material. The one or more metal ions are in Embodiment A can be present in an aqueous solution when contacting the hydrogen-lithium-manganese-oxide material therewith.

In the positive electrode of Embodiment A, a surface of the electrode, the individual particles of the powdered metal oxide composition, or both, can comprise a coating that includes at least one material selected from the group consisting of a metal oxide, a metal fluoride, and a metal polyanionic material. The coating can comprise, for example, at least one material selected from the group consisting of (a) lithium fluoride, (b) aluminum fluoride, (c) a lithium-metal-oxide in which the metal is selected from the group consisting of Al and Zr, (d) a lithium-metal-phosphate in which the metal is selected from the group consisting of Fe, Mn, Co, and Ni, and (e) a lithium-metal-silicate comprising a metal selected from the group comprising Al and Zr.

The hydrogen-lithium-manganese-oxide material in Embodiment A also can include up to 25 atom percent of one or more other transition metal ions replacing manganese ions, lithium ions, or a combination thereof in a manganese-rich layer of the material.

For example, the hydrogen-lithium-manganese-oxide material in step (a) of Embodiment A can be formed by contacting a lithium-manganese-oxide precursor compound with a solution comprising an acid and the one or more metal ions, and the one or more metal ions are inserted into the hydrogen-lithium-manganese-oxide material during the formation thereof wherein the precursor compound comprises lithium, manganese, and oxygen ions in a layered-type structure wherein lithium ions occupy octahedral sites in lithium-rich layers, and the lithium and manganese ions occupy octahedral sites in manganese-rich layers that alternate with the lithium-rich layers. The electrode can contain cation or anion defects and/or stacking faults and dislocations. Preferably, The precursor compound comprises $Li_2MnO_3$ or $Li[Li_{1/3}Mn_{2/3}]O_2$, and optionally includes up to 25 atom percent of one or more other metal ions. The solution comprising the acid and the one or more metal ions also can include one or more metalloid-containing ions, non-metal containing ions, or a combination thereof. The precursor compound can be prepared by the reaction of one or more lithium salts, one or more manganese salts, and optionally one or more other metal salts at elevated temperature (e.g., in the range of about 450 to about 550° C.) in air. The salts can be selected from the group consisting of carbonates, hydroxides, nitrates, and isopropoxides.

In another aspect, the present invention provides a method for fabricating a positive electrode as described herein. The method comprises contacting a hydrogen-lithium-manganese-oxide material as described herein with one or more metal ions to insert the one or more metal ions into the hydrogen-lithium-manganese-oxide material; heat-treating the resulting metal insertion product to form the powdered metal oxide composition; and then forming an electrode therefrom.

One preferred method for fabricating a positive electrode as described herein comprises (a) contacting a hydrogen-lithium-manganese-oxide material described herein with a solution comprising an acid and one or more metal ions to insert the one or more metal ions into the hydrogen-lithium-manganese-oxide material, (b) heat-treating the resulting product to form the powdered metal oxide composition; and (c) then forming the electrode therefrom. In some preferred embodiments, the hydrogen-lithium-manganese-oxide material in step (a) is formed by contacting a precursor compound with the solution comprising the acid and the one or more metal ions, and the one or more metal ions are inserted into the hydrogen-lithium-manganese-oxide material during the formation thereof wherein the precursor compound comprises lithium, manganese, and oxygen ions in a layered-type structure wherein lithium ions occupy octahedral sites in lithium-rich layers, and the lithium and manganese ions occupy octahedral sites in manganese-rich layers that alternate with the lithium-rich layers. A preferred precursor compound comprises $Li_2MnO_3$. Optionally, the hydrogen-lithium-manganese-oxide material and precursor compound can be contacted with one or more stabilizing ions (e.g., lithium ions, magnesium ions, aluminum ions, titanium ions, manganese ions, iron ions, cobalt ions, nickel ions, silicon ions, fluoride ions, phosphate ions, and silicate ions) during step (a). The $Li_2MnO_3$ precursor can be prepared by the reaction of one or more lithium salt and one or more manganese salt at elevated temperature (e.g., about 450° C. and about 550° C.) in air, and can include up to 25 atom percent of one or more other metal ion (e.g., Ti and or Zr), for example by inclusion of one or more salt of the other metal ion with the lithium and manganese salts. In some preferred embodiments, the salts are reacted. The lithium, manganese, and other metal salts can be, for example, carbonates, hydroxides, nitrates and isopropoxides.

In yet another aspect, the present invention provides an electrochemical cell comprising a positive electrode of the invention as described herein, a negative electrode, and a suitable electrolyte, preferably a lithium containing electrolyte, therebetween. The negative electrode preferably comprises a metal selected from the group consisting of lithium, sodium, magnesium, zinc, and aluminum. The negative electrode typically consists either of the pure metal, or an alloy, an intermetallic compound, or an intercalation compound such as those that form with carbon, e.g., graphite or a hard carbon, which can operate either on their own or in combination with one another. The electrolyte can be either a non-aqueous electrolyte or an aqueous electrolyte, depending on the metal used in the electrode structure or other factors that are well known in the art. A battery of the present invention comprises a plurality of the electrochemical cells arranged in parallel, in series, or both.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF THE PREFERRED EMBODIMENTS

Figure 1:
FIG. 1 depicts a schematic illustration of a typical lithium-manganese-oxide precursor structure from which a second electrode precursor of this invention is made.
Figure 1:
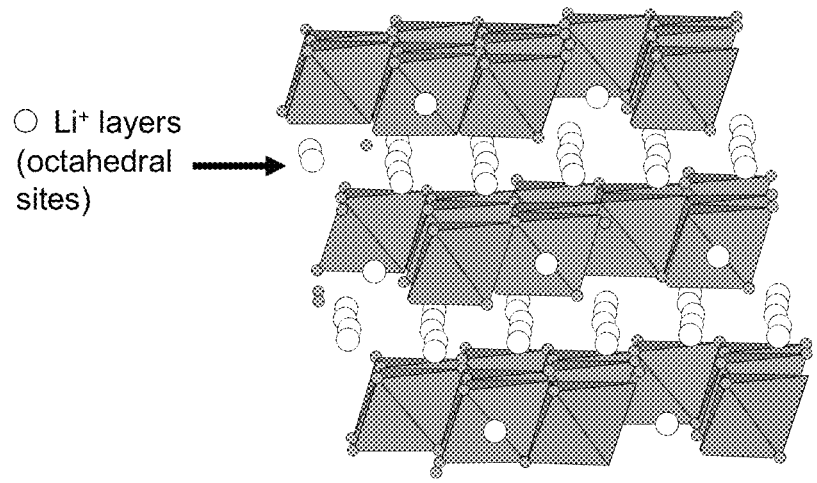

As used herein, the term "lithium-metal-oxide" and grammatical variations thereof, refers to lithium metal oxide compounds, which can optionally include lithium metal oxides in which some oxygen ions, predominantly but not exclusively at the surface, have been replaced by other anionic species, such as fluoride ions. The term "lithium-metal-polyanionic material" and grammatical variations thereof, refers to materials comprising at least one lithium cation, at least one other metal cation (e.g., a Ni or Co cation), and at least one metal-free polyvalent anion (e.g., phosphate, silicate, etc.). The term "hydrogen-lithium-manganese-oxide" refers to materials comprising hydrogen ions, lithium ions, manganese ions and oxygen ions, and optionally one or more other metal ion, arranged preferably in layers as described herein.

Conventional lithium-ion battery cathodes, such as layered $LiCoO_2$, spinel $LiMn_2O_4$, olivine $LiFePO_4$ and compositional variations thereof, do not deliver sufficient electrochemical capacity and power to satisfy the driving range requirements for plug-in hybrid-electric vehicles (PHEVs) and all-electric vehicles. Moreover, there is a growing demand to increase the energy and power of lithium-ion batteries for other wide-ranging applications, such as portable electronic devices, medical devices, aerospace and defense applications and for stand-alone energy storage. Conventional electrode materials such as $LiCoO_2$, $LiMn_2O_4$ and $LiFePO_4$ typically deliver capacities of 100-160 mAh/g between 4.2 and 3.0 V at moderate to high rates. Layered $LiMO_2$ compounds, in which M is selected typically from electroactive metal cations, such as Mn, Co, Ni, and additional stabilizing cations such as Li and Al, provide the best opportunity to increase the electrode capacity and hence the energy of lithium-ion cells and batteries, because they offer a maximum capacity of up to approximately 280 mAh/g at potentials greater than 3.0 V vs. metallic lithium. However, the highly oxidizing character and instability of lithium-metal-oxide electrode structures, in particular, at low lithium loadings, as well as solubility effects, have limited the extent to which this high capacity can be realized, particularly at high rates.

The loss of oxygen from lithium-metal-oxide electrodes, such as layered $LiCoO_2$ and $LiNi_{1-y}Co_yO_2$ electrodes can contribute to exothermic reactions with the electrolyte and with the lithiated carbon negative electrode, and subsequently to thermal runaway if the temperature of the cell reaches a critical value. Further improvements in the composition and structural stability of the bulk and the surfaces of lithium-metal-oxide electrodes are therefore still required to protect the intrinsic capacity of the electrode from decay and to improve the overall performance and safety of lithium-ion cells without compromising the rate capability of the electrode.

Lithium-metal-oxides with spinel-type structure are particularly attractive lithium-ion battery electrodes for high-power applications. Of particular significance is the lithium-manganese-oxide spinel, $LiMn_2O_4$, and its cation-substituted derivatives, $LiMn_{2-x}M_xO_4$, in which M is one or more metal ions typically a monovalent or a multivalent cation such as $Li^+$, $Mg^{2+}$ and $Al^{3+}$, as reported by Gummow et al. in U.S. Pat. No. 5,316,877 and in Solid State Ionics, Volume 69, page 59 (1994). It is well known that $LiMn_2O_4$ and metal-substituted $LiMn_{2-x}M_xO_4$ spinel electrodes are chemically unstable in a lithium-ion cell environment, particularly at high potentials and/or when the cell operating temperature is raised above room temperature, when manganese ions from the spinel electrodes tend to dissolve in the electrolyte. This process is believed to contribute to the capacity loss of the cells at elevated temperatures. Moreover, the removal of all the lithium from $LiMn_{2-x}M_xO_4$ spinel electrodes, notably $LiMn_2O_4$ (x=0), yields a $Mn_{2-x}M_xO_4$ ($MnO_2$, x=0) component, which itself is a strong oxidizing agent. The surface of such delithiated spinel electrodes can have a high oxygen activity, thereby possibly inducing unwanted oxidation reactions with the electrolyte. Although considerable progress has been made to suppress the solubility and high-temperature performance of spinel electrodes and to improve their stability by cation doping, as described for example by Gummow et al. in U.S. Pat. No. 5,316,877, or by forming oxyfluoride compounds as described by Amatucci et al. in the Journal of the Electrochemical Society, Volume 149, page K31 (2002) and by Choi et al. in Electrochemical and Solid-State Letters, Volume 9, page A245-A248 (2006), or by surface coatings as described by Kim et al. in the Journal of the Electrochemical Society, Volume 151, page A1755 (2004), these treatments have not yet entirely overcome the cycling instability of cells containing manganese-based spinel electrodes.

Considerable progress has been made over recent years to stabilize cubic-close-packed layered lithium-metal-oxide electrode systems by using lithium- and manganese-rich composite electrode structures, $xLi_2MnO_3 \cdot (1-)LiMO_2$ in which M is, for example, Mn, Ni, and/or Co, as described in U.S. Pat. No. 6,677,082 and U.S. Pat. No. 6,680,143, and by Kim et al. in Chemistry of Materials, Volume 16, page 1996 (2004), and by Thackeray et al. in the Journal of Materials Chemistry, Volume 17, page 3112 (2007). These electrodes can deliver essentially all their theoretical capacity (240-250 mAh/g) at relatively low rate, for example C/24, as reported by Johnson et al. in Electrochemistry Communications, Volume 6, page 1085 (2004). Composite electrode structures containing cubic-close-packed layered- and spinel components, such as $xLi_2MnO_3 \cdot (1-x)LiMn_{2-x}M_xO_4$ in which M is a metal cation selected preferably from Li, Ni, Co, Al and Mg have also been disclosed, as described for example, by Johnson et al. in Electrochemistry Communications, Volume 7, page 528 (2005), and by Thackeray et al. in the Journal of Materials Chemistry, Volume 15, page 2257 (2005). These composite electrodes form because of the structural compatibility of the cubic-close-packed oxygen arrays of the individual lithium-metal-oxide components. The integrated structures are highly complex and are often characterized by complicated cation arrangements with short range order.

When the manganese and nickel ions are nearest neighbors in layered and spinel electrode structures and in the composite electrode structures described above, they tend to adopt tetravalent and divalent oxidation states, respectively. The lithium and transition metal ions are distributed in highly complex arrangements; the $Li^{3+}$ and $Mn^{4+}$ ions are arranged in small localized regions to give the structure $Li_2MnO_3$-like character. Composite layered materials can be represented either in two-component notation, $xLi_2MnO_3 \cdot (1-x)LiMO_2$, in which the close-packed $Li_2MnO_3$ and $LiMO_2$ components, are structurally integrated or, alternatively, when normalized in standard layered (rock salt) notation, as $Li_{(2+2x)/(2+x)}Mn_{2x/(2+x)}M_{(2-2x)/(2+x)}O_2$. Composite layered $xLi_2MnO_3 \cdot (1-x)LiMO_2$ structures are commonly referred to as 'layered-layered' materials, which reflects the layered character of the $Li_2MnO_3$ and $LiMO_2$ components. The $Li_2MnO_3$ component that supplies surplus lithium to the layered structure plays a critical role in stabilizing the electrode structure at low lithium loadings; on lithium extraction, lithium ions in the transition metal layers diffuse into the lithium depleted layers to provide sufficient binding energy to maintain the integrity of the close-packed oxygen array.

Electrochemical extraction of lithium from $xLi_2MnO_3 \cdot (1-x)LiMO_2$ during the initial charge occurs in two steps. When taken to completion above 4.6 V vs. $Li^0$, the ideal reactions can be represented:

$$LiMO_2 \rightarrow MO_2 + Li^+ + e^- \quad (1)$$

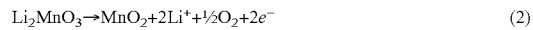

$$Li_2MnO_3 \rightarrow MnO_2 + 2Li^+ + \tfrac{1}{2}O_2 + 2e^- \quad (2)$$

Despite the removal of lithium and oxygen from the $Li_2MnO_3$ component, the layered character of the residual $MnO_2$ component remains remarkably intact. The highly oxidizing nature of both the $MO_2$ and $MnO_2$ components, however, can result in oxygen loss at the particle surface, particularly when M=Co and/or Ni, thereby damaging the electrode surface. Electrolyte oxidation can also occur at these high potentials. These factors limit the rate at which lithium can be reinserted into the charged, high-capacity $xMnO_2 \cdot (1-x)MO_2$ electrode. These electrodes also tend to lose capacity on cycling; the same holds true for 'layered-spinel' composite electrodes $xLi_2MnO_3 \cdot (1-x)LiMn_{2-x}M_xO_4$. 'Layered-layered' $xLi_2MnO_3 \cdot (1-x)LiMO_2$ electrodes, in particular, are also known to suffer from a voltage decay phenomenon on cycling that compromises the energy and energy efficiency of a lithium-ion cell.

Ion exchange reactions from Na-containing precursors to produce Li-ion battery electrode materials using non-aqueous solvents are well known. For example, in a recent development, Johnson et al. have reported in Electrochemistry Communications, Vol. 12, page 1618 (2010) that a lithium-rich nickel-manganese oxide compound $Li_x(Ni_{0.25}Mn_{0.75})O_y$ (x>1) can be synthesized by Li-ion exchange in hexanol from a layered $Na_{0.9}Li_{0.3}Ni_{0.25}Mn_{0.75}O_6$ precursor following previously described techniques as referenced therein. During this reaction, it appears that the layered structure converts from one in which the $Na^+$ ions in the Na-rich layer are in trigonal prismatic coordination to one in which the ion-exchanged $Li^+$ ions are in octahedral coordination and that this transformation appears to generate stacking faults in the oxygen sublattice that contribute to the good cycling stability of the electrode and its ability to discharge at high rates. The X-ray diffraction pattern of the ion-exchanged product $Li_{1.32}Na_{0.02}Ni_{0.25}Mn_{0.75}O_y$ shows a strong peak at approximately 18° 2θ characteristic of both layered- and spinel lithium metal oxide structures, as well as broad peaks, indicative of imperfections in the structure, and a collection of weak peaks in the range 20-23° 2θ region, indicative of $Li^+$ ordering in the transition metal layer, which is characteristic of the basic unit of a $Li_2MnO_3$ structure. $Li/Li_{1.32}Na_{0.02}Ni_{0.25}Mn_{0.75}O_y$ cells provide a stable reversible capacity of 220 mAh/g at a current rate of 15 mA/g and 150 mAh/g at an extremely high rate of 1500 mA/g (i.e., a 15 C rate). The voltage profile generated by the $Li_{1.32}Na_{0.02}Ni_{0.25}Mn_{0.75}O_y$ electrode contains features characteristic of layered and spinel components in the electrode structure.

This invention relates to positive electrode materials for lithium cells and batteries. It relates, in particular, to electrode precursor materials comprising manganese ions and to methods for fabricating lithium-metal-oxide electrode materials and structures using the precursor materials. More specifically, the invention relates to lithium-metal-oxide electrode materials with layered-type structures, spinel-type structures, rock salt-type structures, or integrated structures or combinations of structures or modifications thereof, notably those with imperfections, such as cation or anion defects and/or stacking faults and dislocations. The invention extends to include lithium-metal-oxide electrode materials with surface protection, for example, with metal-oxide, metal-fluoride and/or metal-phosphate layers or coatings to protect the electrodes from highly oxidizing potentials in the cells and from other undesirable effects, such as electrolyte oxidation, oxygen loss and/or dissolution. Such surface protection enhances the surface stability, rate capability and cycling stability of the electrode materials of the invention.

In one embodiment, the lithium-metal-oxide materials of the invention are prepared, for example, by treating a precursor comprising $Li_2MnO_3$, which has a layered-type structure and which has an essentially cubic-close-packed oxygen array, with an acid solution. The $Li_2MnO_3$ precursor, or a precursor containing a $Li_2MnO_3$ component, is synthesized typically in the range of about 300 to 1000° C. (preferably about 400 to about 900° C.). The acid-treatment of the $Li_2MnO_3$ precursor can produce a layered lithium-hydrogen-manganese oxide product, such as $H[Li_{1/3}Mn_{2/3}]O_2$ (i.e., in normalized layered $LiMO_2$ notation in which the oxygen ions are arranged in alternating layers of octahedra and trigonal prisms) and in which the lithium ions are retained, or partially retained, in the transition metal layers. The lithium-manganese-oxide precursor, such as $Li_2MnO_3$, or lithium-hydrogen-manganese oxide precursor produced therefrom, such as $H[Li_{1/3}Mn_{2/3}]O_2$, may be stoichiometric, or non-stoichiometric with anion and/or cation defects. In a second embodiment, the manganese ions in the $Li_2MnO_3$ precursor and the resulting acid-treated product, $H[Li_{1/3}Mn_{2/3}]O_2$, may be partially substituted by one or more multivalent ions, such as alkaline earth metal ions and/or transition metal ions and/or other non-transition metal ions. The $H[Li_{1/3}Mn_{2/3}]O_2$ product, or other compositions formed by the reaction, can react further in a second step with lithium and other metal ions to produce the lithium metal oxide electrodes of the invention after partial or complete removal of the hydrogen ions by ion-exchange and heat-treatment. Alternatively, the acid-treatment of the $Li_2MnO_3$ precursor can occur simultaneously in the presence of lithium ions and other metal ions to produce the substituted lithium metal oxide electrodes in one step, which is considered a notable advantage from processing and cost standpoints. This acid treatment process is followed by the heat-treatment step, typically between 300 and 1000° C. in air, to anneal the electrode material and to partially or completely remove the hydrogen ions from the material.

Typical lithium-metal-oxide products of this invention have layered-type structures, spinel-type structures, rock salt-type structures or combinations of these structure types, such as composite (i.e., structurally-integrated) 'layered-layered' structures, composite 'layered-spinel' structures, 'layered-rock salt' structures, and other complex structurally-integrated types. The invention extends specifically to include electrodes that comprise, at least as one component of the electrode, a composite $Li_2MnO_3$-MO rock salt structure in which M is a metal cation, selected preferably from the first row transition metal elements, such as Ti, Mn, Fe, Co, and Ni. In a particular embodiment, the composite $Li_2MnO_3$-MO rock salt structure may be integrated with other metal oxide components such as a layered $LiMO_2$ component or a spinel $LiM_2O_4$ component, or both. In a further embodiment, the MO component in the electrode structure can be partially substituted by lithium, yielding rock salt components or regions of composition $Li_xM'_{1-x}O$ (0<x<0.5, and M' is one or more metal ion other than Li) that may be either stoichiometric or lithium deficient such that the formula of the defect rock salt component is $Li_{x-y}M'_{1-x}O$ in which y≤x. In a particular embodiment, the structures may be disordered and/or may preferably contain stacking faults and dislocations, such as those that exist, for example, between cubic-closed-packed (ccp) structures (i.e., with ABCABC . . . stacking), hexagonal-close-packed (hcp) structures (i.e., with ABABAB . . . stacking) and those with trigonal prismatic stacking, such as found in the $H[Li_{1/3}Mn_{2/3}]O_2$ precursor of this invention that has a combination of ccp and trigonal prismatic stacking of the oxygen layers (i.e., AABBCC . . . stacking). In practice, there are more complex types of packing sequences because the stacking of oxygen layers in lithium-metal-oxide materials tends to be imperfect. All stacking deviations from ideal close packing and trigonal prismatic stacking, and irregular stacking sequences are therefore included in this invention.

In a further embodiment, the electrode materials of the invention may be surface protected by layers or coatings, the layers or coatings comprising, for example, metal oxides, metal fluorides, metal phosphates, and/or metal silicates particularly, but not exclusively, lithium-metal oxides, lithium-metal fluorides, lithium-metal phosphates and lithium metal silicates to protect the electrode material surfaces from undesirable reactions at high potentials, notably above 4 V. In a preferred embodiment of the invention, the constituents of the coating, such as the aluminum and fluoride ions of an $AlF_3$ coating, the lithium and phosphate ions of a lithium phosphate coating, or the lithium, nickel and phosphate ions of a lithium-nickel-phosphate coating can be incorporated in the solution that is contacted with the hydrogen-lithium-manganese-oxide or lithium-manganese-oxide precursors when forming the electrodes of this invention. For example, the inventors have demonstrated by X-ray absorption spectroscopy that when electrode particles of composition $0.5Li_2MnO_3 \cdot 0.5LiCoO_2$ are subjected to surface treatment in an acidic solution containing $Li^+$, $Ni^{2+}$ and $PO_4^{3-}$ ions, it appears that the phosphate ions have a tendency to leach lithium ions from the surface of the $0.5Li_2MnO_3 \cdot 0.5LiCoO_2$ particles and that the nickel ions migrate into the lithium sites of the transition metal layers, characteristic of the $Li_2MnO_3$-type component in the $0.5Li_2MnO_3 \cdot 0.5LiCoO_2$ structure. Lithium extraction from sites at, or near, the surface of the $0.5Li_2MnO_3 \cdot 0.5LiCoO_2$ structure is likely compensated by the $Ni^{2+}$ ions and the formation of vacancies. This unexpected finding has immediate implications for synthesizing a range of bulk electrode materials and structures, while simultaneously synthesizing and controlling the surface composition and structure of the final product by contacting, for example, the precursor materials comprising $Li_2MnO_3$ or substituted compounds in an acidic medium or the hydrogen-lithium-manganese-oxide materials in accordance with this invention, with one or more metal salts, preferably in solution, for example, salts containing alkali metal cations such as lithium cations, alkaline earth metals such as magnesium cations, transition metal cations such as those of titanium, vanadium, manganese, iron, cobalt, nickel and molybdenum, other metal or metalloid cations such as those of aluminum, silicon, gallium and the like, and/or stabilizing anions such as fluoride ions, phosphate ions, silicate ions or the like. The stabilizing anions, such as fluoride ions or phosphate ions, are preferably contained in solution alternatively, as a non-metal salt, such as $NH_4F$ or the like, or ammonium dihydrogen phosphate, $NH_4H_2PO_4$, or the like, as taught in the Examples, hereafter. 'Layered-layered' $xLi_2MnO_3 \cdot (1-x)LiMO_2$ electrodes, in particular, are also known to suffer from a voltage decay phenomenon on cycling that compromises the energy and energy efficiency of a lithium-ion cell.

Figure 2:
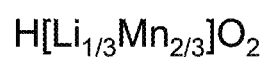
FIG. 2 depicts a schematic illustration of a typical lithium-hydrogen-manganese-oxide precursor structure from which the electrode materials of this invention can be made.
Figure 2:
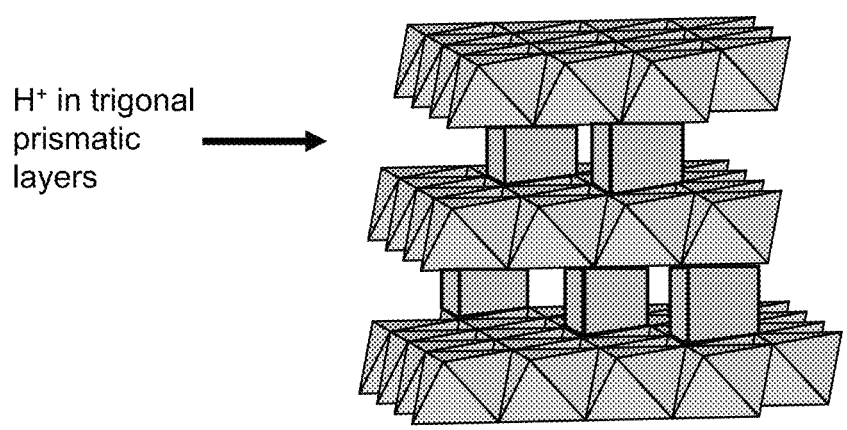
Figure 3:
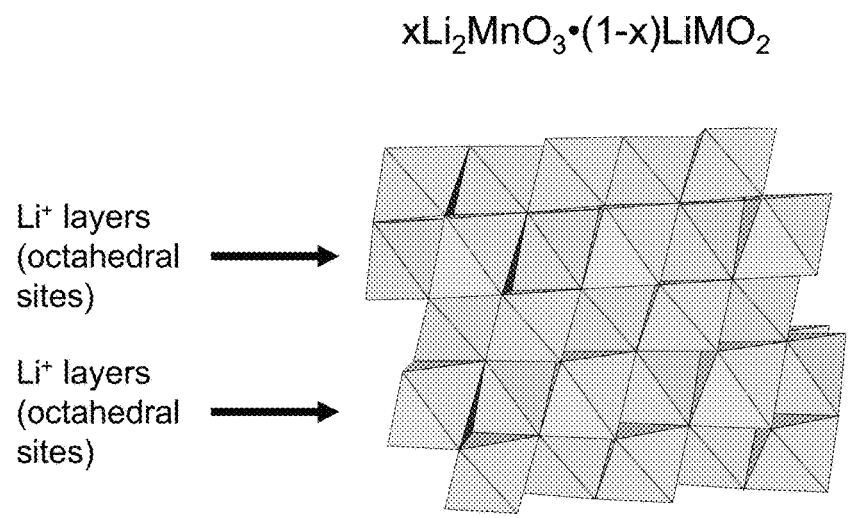
FIG. 3 depicts a schematic illustration of a typical lithium-metal-oxide structure of this invention, without stacking faults and dislocations, for clarity.

It is clear from the principles of the invention described above, that numerous materials and compositions can be derived from these reactions with layered $Li_2MnO_3$-type precursors, as depicted schematically in FIG. 1, and particularly with $H[Li_{1/3}Mn_{2/3}]O_2$-type precursors, as depicted schematically in FIG. 2, in which the trigonal prismatic arrangement of the oxygen ions is conducive to the introduction of stacking faults, dislocations and other structural imperfections during its reaction with lithium and other desirable cationic species to generate close-packed lithium-metal-oxide electrode structures, as depicted schematically (without the stacking faults and imperfections, for convenience) in FIG. 3. It is believed that these structural imperfections contribute to enhanced electrochemical performance such as cycling stability, improved capacity and power, and to providing resistance to phase transformations during cycling, such as the transformation of delithiated layered components in the structure to spinel. The lithium- and manganese-based metal oxide materials produced by these reactions are particularly useful as positive electrodes in lithium batteries, notably lithium-ion batteries that operate typically between about 4.6 V and 2.0 V. The synthesis reaction conditions and composition of the targeted lithium metal oxide material can be modified to produce a wide range of electrode compositions and structures, notably those based on layered- and spinel-type structures and structurally-integrated products.

Specific advantages of this invention include, for example the following:

(1) A significant advantage of using a $H[Li_{1/3}Mn_{2/3}]O_2$-type precursor that contains oxygen ions in a trigonal prismatic arrangement is that H is lost during the fabrication of the final lithium-metal-oxide product, which provides greater flexibility in controlling the structure and the electrochemical properties of the product by tailoring, for example, the degree of imperfections, stacking faults and disorder, whereas the Li-ion exchanged products from Na-based precursors always contain some Na ions which remain associated with the product during and after fabrication of the electrode.

(2) By using aqueous solutions, the approach provides the advantage of avoiding the non-aqueous Li-ion exchange step required for Na-based precursors, which although possible, is believed to be costly.

(3) The reaction method holds the possibility of making an extremely wide variety of compounds and compositions, e.g., spinel and layered compounds, composite 'layered-layered'-type, composite 'layered-spinel'-type and, unexpectedly, composite 'layered-rock salt'-type structures, as well as other more complex structure types, particularly those with structural imperfections, such as stacking faults and dislocations and those with various degrees of order and disorder.

(4) A particularly significant advantage of the electrode materials described herein is that, unlike the prior art that generally teaches a one-step mixing of the lithium and metal cations during the synthesis of lithium-metal-oxide electrodes for lithium battery applications, this invention teaches the advantage of tailoring the amount of stabilizing cations in the lithium-rich layers of the product by an ion-exchange process with a $Li_2MnO_3$ precursor, which acts as a template to control the extent to which the $Li_2MnO_3$-based lithium-metal-oxide electrodes of this invention are structurally integrated with and composed of layered, spinel, and rock-salt components (and more complex disordered derivatives thereof), thereby leading to enhanced structural and electrochemical stability over typical state-of-the-art lithium-metal-oxide electrode materials.

(5) The electrodes can be used in other cell/battery types, such as those containing aqueous electrolytes, e.g., those with lithium anodes in conjunction with a solid electrolyte membrane, as well as other non-aqueous systems, e.g., those with sodium or magnesium anodes, depending on the cations and anions that can be introduced into a $Li_2MnO_3$ precursor, or a hydrogen-lithium-manganese-oxide precursor derived therefrom, as described herein.

In a further embodiment, the invention includes lithium-metal-oxide electrode materials, the surface of the individual particles being protected, for example, with metal-oxide, metal-fluoride and/or metal-polyanionic layers or coatings to protect the electrodes from highly oxidizing potentials in the cells and from other undesirable effects, such as electrolyte oxidation, oxygen loss and/or dissolution. Such surface protection enhances the surface stability, rate capability and cycling stability of the electrodes of this invention. In one embodiment, the lithium-metal-oxide particles of the electrode are protected by, and comprised of, one or more metal fluorides, metal oxides or metal-polyanionic materials, such as lithium fluoride, a lithium-metal-oxide, a lithium-metal-phosphate, a lithium-metal-silicate or the like, in which the polyanion is comprised of a negatively charged species that contains more than one atom type, for example $WO_3^-$, $MoO_3^-$, $SO_4^{2-}$, $PO_4^{3-}$, $SiO_4^{4-}$. In a preferred embodiment, the metal fluorides, metal oxides or metal-polyanionic materials can act as lithium-ion conductors at or above the operating potential of the lithium-metal-oxide positive electrode to provide access of the lithium ions from the electrolyte to the electrode during discharge, and vice-versa during charge, while simultaneously protecting the surface of the electrode from undesirable effects, such as electrolyte oxidation, oxygen loss or dissolution. Such surface protection significantly enhances the surface stability, rate capability and cycling stability of the lithium-metal-oxide electrodes, particularly when charged to high potentials.

In a further embodiment of this invention, the electrodes can be protected by a modified surface, surface layer or coating comprising metal fluorides, metal oxides or metal-polyanionic materials that are stable at and/or above the operating electrochemical potential of the lithium-metal-oxide electrode. The terms 'modified surface', 'surface layer' and 'coating' include all forms of surface modifications that serve to stabilize the electrode surface, for example, deposited particles, deposited films, anion and cation substitutions, compositional gradients at the surface, and the like. It is desirable that the modified surface, surface layer or coating should act predominantly or exclusively as a stable lithium-ion conductor that operates preferably at or above 4 V, more preferably at or above 4.5 V and most preferably at or above 5.0 V versus metallic lithium, thereby allowing the electrode to operate repeatedly at high rates without subjecting the modified surface, surface layer or coating to potentially damaging redox reactions that might affect the electrochemical properties of the electrode.

The metal fluorides, metal oxides or metal-polyanionic materials may be comprised of one or more metals, and it may be amorphous or, alternatively, it may be poorly crystalline or strongly crystalline with either stoichiometric structures or cation and/or anion defect structures. The metal fluorides are comprised preferably of one or more of lithium fluoride, aluminum fluorides and compounds thereof, whereas, the metal oxides are comprised preferably of lithium oxide, aluminum oxide, zirconium oxide and compounds thereof, such as the family of lithium aluminum oxide compounds and lithium zirconium oxide compounds. The metal-polyanionic material is comprised preferably of one or more lithium-metal-phosphate or lithium-metal-silicate materials, for example, those selected from the family of lithium-nickel-phosphate-, lithium-cobalt-phosphate-, lithium-nickel-silicate-, and lithium-cobalt-silicate materials.

In a further preferred embodiment, the lithium-metal-polyanionic material is comprised of lithium-nickel-phosphate, lithium-cobalt-phosphate, lithium-nickel-silicate, and/or lithium-cobalt-silicate compositions and structures, including stoichiometric or defect olivine-related $LiMPO_4$ structures (for example, M=Ni, Co), $Li_3PO_4$-related structures as well as metal-substituted $Li_3PO_4$-related structures, such as defect $Li_{3-x}M_{x/2}PO_4$ (for example, M=Ni, Co; $0<x<2$) structures, and $Li_2MSiO_4$-related structures such as stoichiometric $Li_2NiSiO_4$ and $Li_2CoSiO_4$ and defect $Li_{2-x}MSiO_4$ structures. In the stoichiometric and defect compounds of this invention, such as $LiMPO_4$, $Li_{3-x}M_{x/2}PO_4$, $Li_2MSiO_4$ and $Li_{2-x}MSiO_4$ compositions and structures, the M cations may be partially or completely substituted by other metal cations, for example, divalent cations, such as $Mg^{2+}$ or $Zn^{2+}$ ions, and trivalent cations, such as $Al^{3+}$ ions, and tetravalent cations, such as $Zr^{4+}$ ions, that can also form lithium-ion conducting, solid electrolyte compounds. Of particular significance is the advantage that lithium-metal-polyanionic materials containing divalent metal cations, such as $LiNiPO_4$ and $LiCoPO_4$, surprisingly can remain stable and electrochemically inactive to lithium extraction to a high electrochemical potential of approximately 5 V vs. lithium metal. The applicants believe that a particular advantage of having stable divalent nickel ions in the modified surface, surface layer or coating may aid to stabilize manganese-based lithium-metal-oxide electrodes because any $Ni^{2+}/Mn^{4+}$ nearest neighbor interactions would contribute further to stabilizing the lithium-metal-oxide electrode surface by suppressing surface $Mn^{3+}$ species and manganese solubility.

The lithium-metal-polyanionic material of this invention may also include $Li_3PO_4$ as a component of the protective layer. In this respect, $Li_3PO_4$ may either be the major component (>50%) or the minor component (<50%) of the surface structure or, alternatively, it may be used entirely as the protective surface layer or coating of the lithium-metal-oxide electrode.

In a further embodiment, the invention extends to include $Li_4SiO_4$-related compositions and structures and substituted compositions and structures, for example, metal-substituted, defect $Li_{4-x}M_{x/2}SiO_4$ structures in which M is one or more divalent cations such as $Ni^{2+}$, $Co^{2+}$, $Mg^{2+}$ and $Zn^{2+}$ and $0<x<2$. In metal-substituted $Li_4SiO_4$ structures, the substituted M cations may alternatively be comprised partially of trivalent cations, such as $Al^{3+}$ ions, or tetravalent cations, such as $Zr^{4+}$ ions, that can form lithium-ion conducting compounds.

The invention extends to electrode precursor materials comprising manganese ions and to methods for fabricating lithium-metal-oxide electrode materials and structures using these precursor materials. In a particularly preferred embodiment, the method involves, as a first step, the acid treatment of a material comprising $Li_2MnO_3$, for example, stoichiometric, cation deficient, or anion deficient $Li_2MnO_3$, composite structures and materials such as 'layered-layered' $xLi_2MnO_3.(1-x)LiMO_2$, 'layered-spinel' $xLi_2MnO_3.(1-x)LiM_2O_4$, and $xLi_2MnO_3.(1-x)MO$, or combinations thereof, for example, a material or structure consisting of 'layered-layered' $xLi_2MnO_3.(1-x)LiMO_2$ and MO components, in which M is one or more suitable metal cations as known in the art, and in which $0<x<1$. The $Li_2MnO_3$ precursors and those that contain up to 25% of alternative metal ions, such as Ti or Zr, as described herein, are typically prepared by well known reaction procedures, for example, by the reaction of various lithium-, manganese- and other metal salts, such as carbonates, hydroxides, nitrates, and isopropoxides in air at temperatures typically above about 450° C., and preferably below about 550° C., as described in the examples of this invention. To those skilled in the art, it will be obvious that other well known precursor salts, such as lithium-, manganese- and other metal oxyhydroxides, acetates and the like, can also be used for this purpose. The acid treatment process leaches lithium from the $Li_2MnO_3$-comprising materials, which may induce a change in the arrangement of the oxygen ion layers that sandwich the lithium layers from an octahedral arrangement of oxygen ions to a trigonal prismatic arrangement of oxygen ions. In a second step, the $H[Li_{1/3}Mn_{2/3}]O_2$ product, or other compositions formed by the reaction, can react further with lithium and other metal ions to produce the lithium metal oxide electrodes of the invention after partial or complete removal of the hydrogen ions by ion-exchange and heat-treatment. Alternatively, the acid-treatment of the $Li_2MnO_3$ precursor can occur simultaneously in the presence of lithium ions and other metal ions to produce the substituted lithium metal oxide electrodes in one step; this acid treatment process is followed by the heat-treatment step, typically in the range of about 300 to 1000° C. (preferably about 400 to about 950° C.) and typically in air at ambient pressure to partially or completely remove the hydrogen ions from the electrode material. Other oxidizing, reducing or inert atmospheres and pressure conditions can alternatively be used to control the composition and electrochemical properties of the final product, if required.

Figure 20:
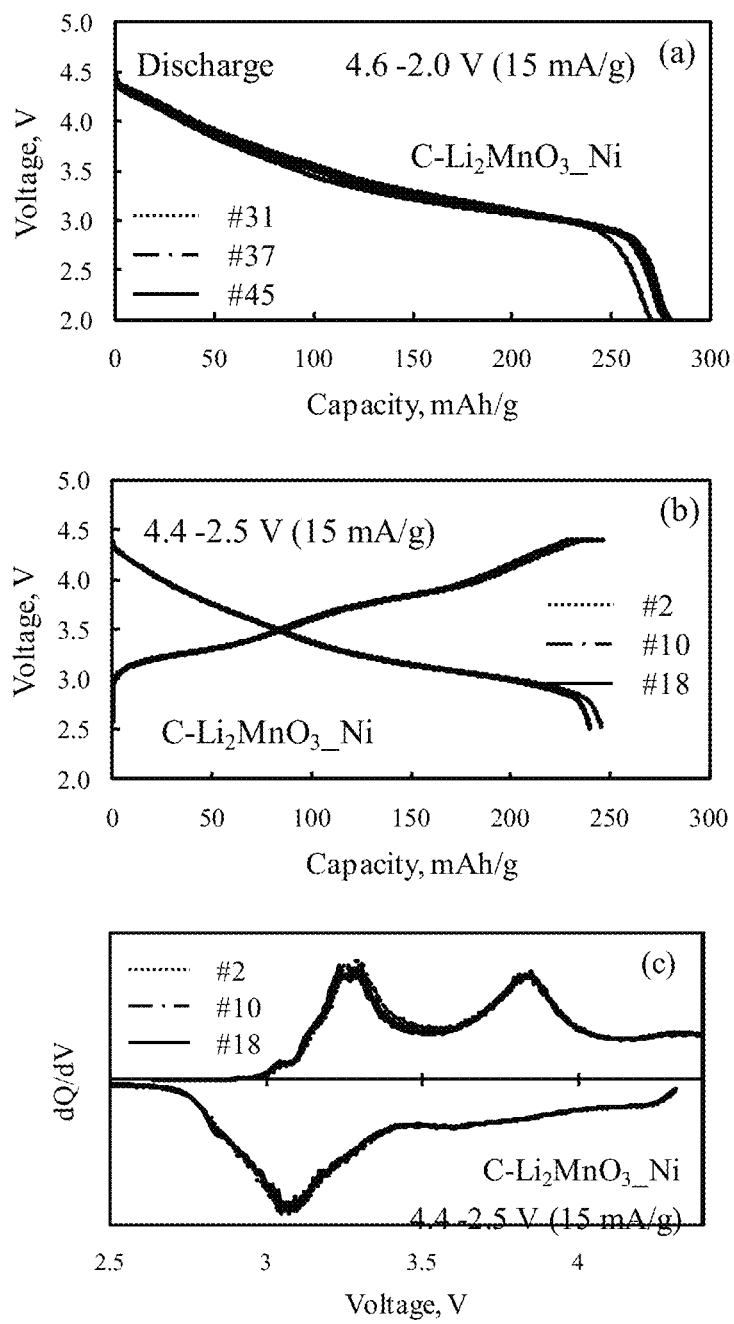
FIG. 20 depicts (a) the electrochemical charge/discharge profiles of a $LiC$—$Li_2MnO_3\_Ni$ cell in which the $Li_2MnO_3\_Ni$ cathode had a targeted lithium-rich composition $Li_{1.2}Mn_{0.6}Ni_{0.2}O_2$ (in standard layered notation), cycled between 4.6 and 2.0 V for 45 cycles; (b) the electrochemical charge/discharge profiles during further cycling of the cell between 4.4 and 2.5 V; and (c) corresponding dQ/dV plots of the cell cycled between 4.4 and 2.5 V.

In an additional embodiment, it has been discovered from the examples provided in this invention that electrodes with targeted composition $0.5Li_2MnO_3.0.5LiMn_{0.5}Ni_{0.5}O_2$ can deliver high capacities and can cycle with remarkable stability (e.g., as in Example 15 and FIG. 20). X-ray absorption data shows that the stability of the electrode can likely be attributed to Mn—Ni nearest neighbor interactions, and that regions of high manganese concentration are likely responsible for changes to the Mn coordination environment on cycling and a consequent loss of cycling stability, consistent with the generation of 'spinel-like' regions within the structure. This invention therefore extends to a closely-related method for fabricating the stabilized 'layered-layered', 'layered-spinel', 'layered-layered-spinel', 'layered-rocksalt', 'layered-layered-rocksalt', 'layered-layered-spinel-rocksalt' structural configurations and more complex configurations of this invention, whereby a lithium-metal (M)-oxide compound, in which M comprises a metal cation such as Mn, Ni, Co, for example $LiMn_{0.5}Ni_{0.5}O_2$ and $LiMn_{0.33}Ni_{0.33}Co_{0.33}O_2$ in which the Mn ions are surrounded predominantly by non-Mn ions (e.g., Ni and/or Co), i.e., preferably by more than 50%, is used as a solid precursor that can be reacted, for example, with lithium and manganese ions in solution, optionally in the presence of other metal ions or surface stabilizing cations and/or anions as described hereinbefore, typically in a Li:Mn ratio of 2:1 in accordance with the formula of a stabilizing component $Li_2MnO_3$, at room temperature and subsequently heated and annealed at higher temperature to dry the product and form a composite electrode structure, respectively, as previously described.

More specifically, therefore, this invention extends to include a method for fabricating a positive electrode comprising: (a) contacting a lithium-metal-oxide material wherein the metal comprises manganese and nickel with lithium ions and optionally one or more metal ions, such as manganese ions, to insert the lithium ions and one or more metal ions into the lithium-metal-oxide material; (b) heat-treating the resulting product to form a powdered metal oxide composition; and (c) forming an electrode from the powdered metal oxide composition. In a particular embodiment, the lithium-metal-oxide material in step (a) is formed by contacting a lithium-metal-oxide precursor compound with a solution comprising an acid with lithium ions and optionally one or more metal ions, the lithium ions and one or more metal ions being inserted into the lithium-metal-oxide material during the formation thereof; wherein the precursor compound comprises lithium, manganese, one or more other metal ions and oxygen ions in a layered-type structure. In a preferred embodiment, the metal of the lithium-metal-oxide material comprises manganese, nickel and cobalt ions, such as $LiMn_{0.5}Ni_{0.5}O_2$ or $LiMn_{0.33}Ni_{0.33}Co_{0.33}O_2$, in which the manganese ions have transition metal nearest neighbors or, preferably, lithium and transition metal neighbors such as in the flower pattern of an idealized $LiMn_{0.5}Ni_{0.5}O_2$ structure, as described by van der Ven et al. in Electrochemistry Communications 6, Volume 6, pages 1045-1050 (2004), and Thackeray et al. in the Journal of Materials Chemistry, Volume 17, pages 3112-3125 (2007). The surface of the electrode, the individual particles of the powdered metal oxide composition thus formed, or both, may comprise a coating that includes at least one material selected from the group consisting of a metal oxide, a metal fluoride, and a metal polyanionic material to provide additional stability to the electrode when operated in an electrochemical cell.

From the principles of the invention described above, it will be clear to those skilled in the art that numerous materials, compositions and structure types can be derived from $Li_2MnO_3$-type precursors, $H[Li_{1/3}Mn_{2/3}]O_2$-type precursors, or lithium metal oxide precursors by varying the reaction conditions. The lithium-metal-oxide materials produced by these reactions are particularly useful as positive electrodes for lithium-ion batteries. The principles of this invention extends to include other electrochemical cells and battery types, such as those containing aqueous electrolytes, for example those with lithium anodes in conjunction with a solid electrolyte membrane, as well as other non-aqueous systems, for example those with sodium or magnesium anodes. The electrochemical cells and batteries of this invention can be primary cells and batteries, or secondary (rechargeable) cells and batteries.

The following examples describe the principles of the invention as contemplated by the inventors, but they are not to be construed as limiting examples.

EXAMPLE 1

Formation of a Powdered Metal Oxide Material for a Positive Electrode of the Invention Describing Selected Principles of the Invention Step 1.

$Li_2MnO_3$ can be synthesized typically at about 400-500° C. and contacted with approximately 2 M sulfuric acid or nitric acid at room temperature to form a precursor of nominal composition $H[Li_{1/3}Mn_{2/3}]O_2$, which is then filtered and dried. For example, FIG. 4a shows the X-ray diffraction pattern of a typical $Li_2MnO_3$ precursor synthesized at 450° C. and FIG. 4b when acid treated with 2 M $HNO_3$. The broad peak centered at approximately 15 degrees 2θ (2-theta) is from petroleum jelly on the sample holder and the sharp peak at approximately 51 degrees 2θ is from the sample holder. The acid-treated sample shows relatively strong peaks at approximately 19, 38 and 49 degrees 2θ, as well as revealing a substantial reduction of the peak at approximately 45 degrees 2θ. These results are consistent with a P3-type layered structure with H ions within trigonal prismatic sites of one layer, and the remaining Mn and Li ions in octahedral sites of adjacent layers.

Step 2.

The $H[Li_{1/3}Mn_{2/3}]O_2$ can be subsequently reacted with salts of Li, Ni, Mn, such as lithium hydroxides, nitrates, sulfates or carbonates, nickel hydroxides, nitrates, sulfates or carbonates, or manganese hydroxides, nitrates, sulfates or carbonates either in solution or in the solid state and subsequently heated, typically at 400 to 950° C., to form a powdered metal oxide composition used to prepare a positive electrode of the invention. One specific example of such a reaction is summarized in Reaction A, below:

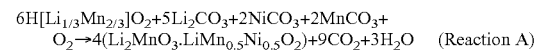

$6H[Li_{1/3}Mn_{2/3}]O_2 + 5Li_2CO_3 + 2NiCO_3 + 2MnCO_3 + O_2 \rightarrow 4(Li_2MnO_3 \cdot LiMn_{0.5}Ni_{0.5}O_2) + 9CO_2 + 3H_2O$ (Reaction A)

In this reaction, the conversion from trigonal prismatic configuration of the oxygen ions in the layered $H[Li_{1/3}Mn_{2/3}]O_2$ precursor to octahedral configuration in the $Li_2MnO_3 \cdot LiMn_{0.5}Ni_{0.5}O_2$ product can give rise to stacking faults to stabilize the composite structure to lithium insertion and extraction reactions without significantly impacting rate capability.

Other lithium metal oxide compositions can be synthesized by selectively varying the relative amounts of the $H[Li_{1/3}Mn_{2/3}]O_2$ precursor as well as the lithium and metal salts in Step 2.

EXAMPLE 2

Formation of a Powdered Metal Oxide Material for a Positive Electrode of the Invention Describing Selected Principles of the Invention In this example, the $Li_2MnO_3$ precursor material, as described in Example 1 above, is treated typically with acid at the same time that it is reacted with the lithium, nickel and manganese nitrates in acid solution, after which it is heated to dryness and annealed at higher temperature, e.g., about 400-600° C. such that essentially all the lithium in the original precursor remains in the final $4(Li_2MnO_3 \cdot LiMn_{0.5}Ni_{0.5}O_2)$ product. In this case, the ideal reaction can be represented as in Reaction B:

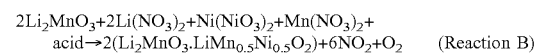

$2Li_2MnO_3 + 2Li(NO_3)_2 + Ni(NiO_3)_2 + Mn(NO_3)_2 + acid \rightarrow 2(Li_2MnO_3 \cdot LiMn_{0.5}Ni_{0.5}O_2) + 6NO_2 + O_2$ (Reaction B)

Other lithium metal oxide compositions can be synthesized by selectively varying the relative amounts of the H[Li$_{1/3}$Mn$_{2/3}$]O$_2$ precursor as well as the lithium and the metal salts in the reaction above. Moreover, numerous metal salts can be used to prepare compounds over an extremely wide compositional range. Note that, in Reaction B, oxygen is generated by the reaction to form the Li$_2$MnO$_3$·LiMn$_{0.5}$Ni$_{0.5}$O$_2$ product of the invention whereas in Reaction A oxygen is consumed to form the product. Reaction B is preferred to Reaction A because the product is synthesized in a one-step reaction directly from a Li$_2$MnO$_3$ precursor, rather than a two-step reaction with the formation of a discrete hydrogen-lithium-manganese-oxide intermediate in Reaction A.

EXAMPLE 3

Electrochemical Evaluation of a Powdered Metal Oxide Material for a Positive Electrode of the Invention For the electrochemical evaluation of the lithium metal oxide materials produced by the methods described herein, coin-type cells (2032, Hohsen) are typically used. The cells are constructed in an argon-filled glove box (<5 ppm O$_2$ and H$_2$O). The cathode consists typically of 80 wt % of the lithium metal oxide powder, 10 wt % carbon, and 10 wt % polyvinylidene difluoride (PVDF) binder on aluminum foil. The anode can be e.g. either metallic lithium or graphite (MAG-10, Hitachi with 8 wt % PVDF) on copper foil. The electrolyte is typically 1.2M LiPF$_6$ in a 3:7 mixture of ethylene carbonate and ethylmethyl carbonate. For the cycling experiments, cells are galvanostatically charged and discharged typically between 2.0 and 4.6 V (2.0 and 4.5 V for the Li-ion cells) at different currents (0.1-2.0 mA/cm$^2$) and trickle charged at 4.6 V for 3 hours. For typical rate tests, lithium cells are charged to 4.6 V at 0.1 mA/cm$^2$ with a trickle charge at 4.6 V for 3 hours; cells are discharged to 2.0 V at 0.1 to 1.0 mA/cm$^2$ with three cycles at each rate. Alternatively, electrochemical cells can be subjected to one discharge at various rates to assess the rate capability of the cathode material. Electrochemical experiments are conducted typically at room temperature and at elevated temperature (about 50° C.) and duplicated to check reproducibility.

EXAMPLE 4

Figure 4:
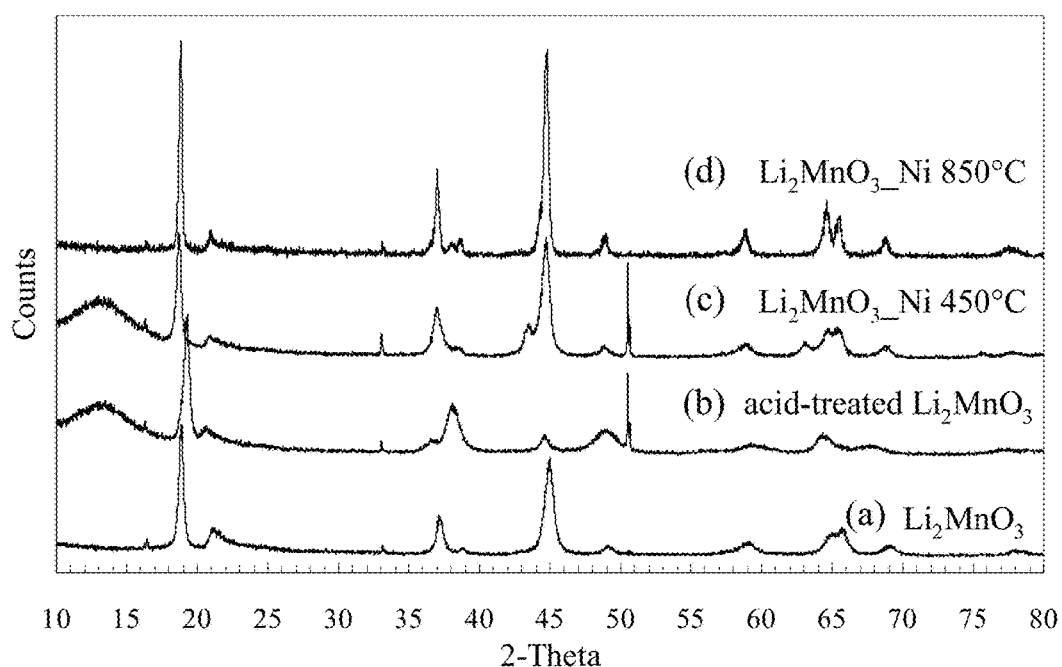
FIG. 4 depicts the X-ray diffraction patterns of (a) a $Li_2MnO_3$ precursor product synthesized at 450° C.; (b) an acid-treated $Li_2MnO_3$ product derived from (a); (c) a Ni-containing $Li_2MnO_3$ product of this invention prepared at 450° C. ("$Li_2MnO_3$_Ni-450"; and (d) a Ni-containing $Li_2MnO_3$ product of this invention prepared at 850° C. ("$Li_2MnO_3$_Ni-850").

Li$_2$MnO$_3$ was prepared by the following general procedure: MnCO$_3$ was added to an aqueous solution of LiOH·H$_2$O in the required stoichiometric amount and stirred for about 45 minutes to 1 hour. The liquid from the solution was evaporated at approximately 80° C., and a solid product was collected and ground to a powder. The powder was then annealed at about 450° C. for about 30 hours in air. The X-ray diffraction pattern of the annealed Li$_2$MnO$_3$ product is shown in FIG. 4, trace (a). The X-ray diffraction pattern of the acid-treated Li$_2$MnO$_3$ product is shown in FIG. 4, trace (b).

A Li$_2$MnO$_3$ product containing nickel with a targeted composition 0.5Li$_2$MnO$_3$·0.5LiMn$_{0.5}$Ni$_{0.5}$O$_2$ was prepared as follows: the Li$_2$MnO$_3$ precursor produced by the method described above was reacted with the stoichiometrically required amount of nickel nitrate in a 0.1 M solution of HNO$_3$ and stirred overnight at room temperature, i.e., the Li:Mn:Ni ratio in the Li$_2$MnO$_3$/nitric acid solution was about 1.50:0.75:0.25. The liquid from the solution was evaporated at approximately 70° C., and the resulting solid product was collected and ground to a powder. The powder was then annealed at about 450° C. for about 6 hours in air. The X-ray diffraction pattern of the annealed nickel-containing Li$_2$MnO$_3$ product, labeled "Li$_2$MnO$_3$_Ni-450" is shown in FIG. 4, trace (c), and when annealed at about 850° C. for about 6 hours in air in FIG. 4, trace (d), labeled "Li$_2$MnO$_3$_Ni-850".

In the X-ray diffraction patterns depicted in FIG. 4, the broad peak centered at approximately 15 degrees 2θ is from petroleum jelly on the sample holder. The sharp peaks centered at approximately 33 and 51 degrees 2θ are from the sample holder. The X-ray diffraction pattern of the Li$_2$MnO$_3$ product is consistent with that expected for its characteristic layered-type structure. The X-ray diffraction pattern of the "Li$_2$MnO$_3$_Ni-450" product shows additional peaks centered at approximately 44 and 63 degrees 2θ, consistent with either an integrated structure or a combination of structures comprising Li$_2$MnO$_3$, in accordance with the principles of this invention. These additional peaks correspond closely to those expected for the rock salt phase NiO or possibly a Li-substituted Li$_x$Ni$_{1-x}$O phase, in which x can be small, for example, less than 0.1. X-ray absorption data have demonstrated that the nickel ions appear to exist in this compound predominantly in the divalent state. For Li$_x$Ni$_{1-x}$O compositions that contain Ni$^{2+}$ and Ni$^{3+}$ ions, it is anticipated that lithium will be extracted electrochemically in an electrochemical cell, to yield a lithium deficient component, Li$_{x-y}$Ni$_{1-x}$O, in which y≤x.

The X-ray diffraction pattern of the "Li$_2$MnO$_3$_Ni-850" product in FIG. 4, trace (d) is typical of a 'layered-layered' composite structure with the targeted composition 0.5Li$_2$MnO$_3$·0.5LiMn$_{0.5}$Ni$_{0.5}$O$_2$. This example, therefore demonstrates the general principle and versatility of the approach described herein, in that improved and modified Li$_2$MnO$_3$-based lithium-metal-oxide composite electrode structures and products can be synthesized simply by reacting Li$_2$MnO$_3$ with an acidic solution containing the metal ions, which are required for a particular electrode composition, and annealing the dried product at an appropriate temperature to optimize the structural properties and compositional parameters for optimum electrochemical performance. Furthermore, the synthesis approach taught herein includes the selection and addition of ions in the acidic solution, such as F$^-$ ions and PO$_4^{3-}$ ions, which can provide surface protection for the composite electrode structures when cycled in lithium cells. In this respect, the advantages of this one-step approach to synthesize surface protected composite electrode structures from a Li$_2$MnO$_3$ precursor are illustrated by the examples provided in this invention.

Figure 5:
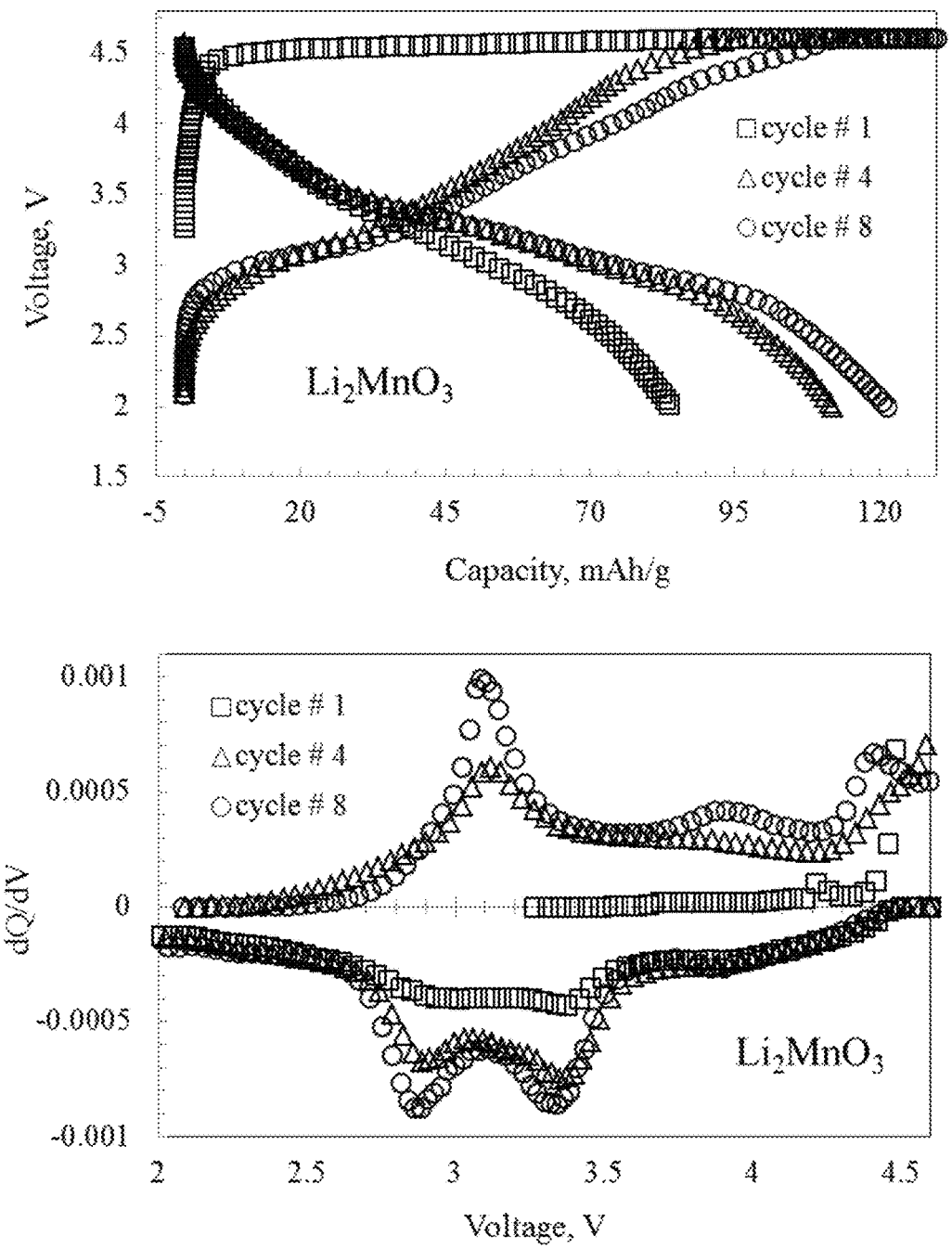
FIG. 5 depicts (top) the electrochemical charge/discharge profiles of a $Li/Li_2MnO_3$ cell, and (bottom) corresponding dQ/dV plots of the cell.
Figure 6:
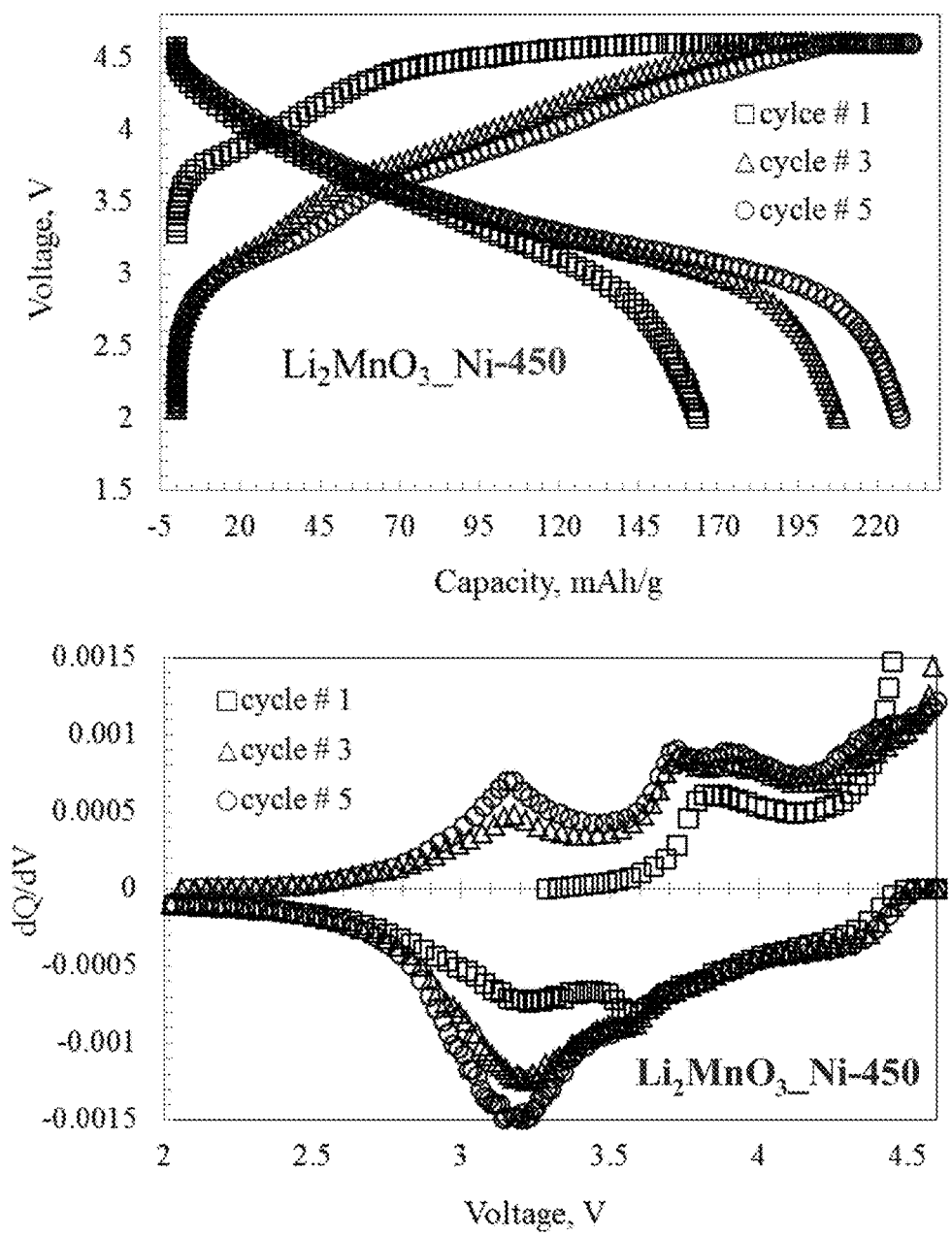
FIG. 6 depicts (top) the electrochemical charge/discharge profiles of a $Li/Li_2MnO_3$_Ni-450 cell, and (bottom) corresponding dQ/dV plots of the cell, in which the cathode is comprised of a Ni-containing $Li_2MnO_3$ product of this invention with a targeted composition $0.5Li_2MnO_3.0.5LiMn_{0.05}Ni_{0.5}O_2$.

FIG. 5 and FIG. 6 respectively illustrate the electrochemical properties of the Li$_2$MnO$_3$ and Li$_2$MnO$_3$_Ni products when used as electrodes in lithium cells, constructed in accordance with the general procedure outlined for Example 3. The top panel of FIG. 5 shows the typical charge/discharge voltage profiles of a Li/Li$_2$MnO$_3$ cell for the 1st, 4th, and 8th cycles. The capacity of the Li$_2$MnO$_3$ electrode increased steadily from about 80 mAh/g to about 120 mAh/g over these cycles. The corresponding dQ/dV plots for these cycles are shown in the bottom panel of FIG. 5. The plots are characterized by two strong reduction peaks, the reversible peak below about 2.8 V, which increases on cycling, being attributed to the formation and growth of a spinel phase on cycling.

The corresponding voltage profiles and dQ/dV plots for a Li/Li$_2$MnO$_3$_Ni-450 cell of the present invention are shown in the respective top and bottom panels of FIG. 6. It is clear from the top panel of FIG. 6 that the $Li_2MnO_3$_Ni-450 electrode of the invention provided a significantly higher capacity than the $Li_2MnO_3$ electrode, yielding an initial capacity of approximately 165 mAh/g, which increased to approximately 225 mAh/g over the first five cycles. The dQ/dV plot of this cell is surprisingly different to that of the cell containing the $Li_2MnO_3$ electrode, in that the cell of the invention unexpectedly afforded only one major, reversible reduction peak above about 3 V, which strongly suggests that the electrode of the invention has a significant advantage over the comparative $Li_2MnO_3$ electrode by suppressing the formation of a spinel phase on cycling, thereby providing superior electrochemical capacity. This finding is significant. Analysis of the X-ray diffraction and X-ray absorption data of the $Li_2MnO_3$_Ni-450 electrode powder before and after cycling indicated that the electrode is comprised of layered $Li_2MnO_3$-like regions and rock salt NiO-type regions. Moreover, the electrochemical data show a continuously sloping voltage profile that maintains its shape on cycling, thereby indicating that there is negligible transformation of the layered component to spinel. This invention therefore extends specifically to include precursor electrodes that comprise, at least as one component of the precursor electrode, a composite $Li_2MnO_3$-MO rock salt structure in which M is a divalent metal cation, selected preferably from the first row transition metal elements, such as Ti, Mn, Fe, Co, and Ni. In a further embodiment, the MO component in the precursor electrode structure can be partially substituted by lithium, yielding rock salt components or regions $Li_xM'_{1-x}O$ ($0<x<0.5$; M' is one or more metal ions other than Li) and that may be either stoichiometric or lithium deficient with formula $Li_{x-y}M'_{1-x}O$ in which $y \leq x$. In yet a further embodiment of the invention, the $Li_2MnO_3$ and MO components are integrated or combined with one or more other components with spinel and/or layered-type structures.

Figure 7:
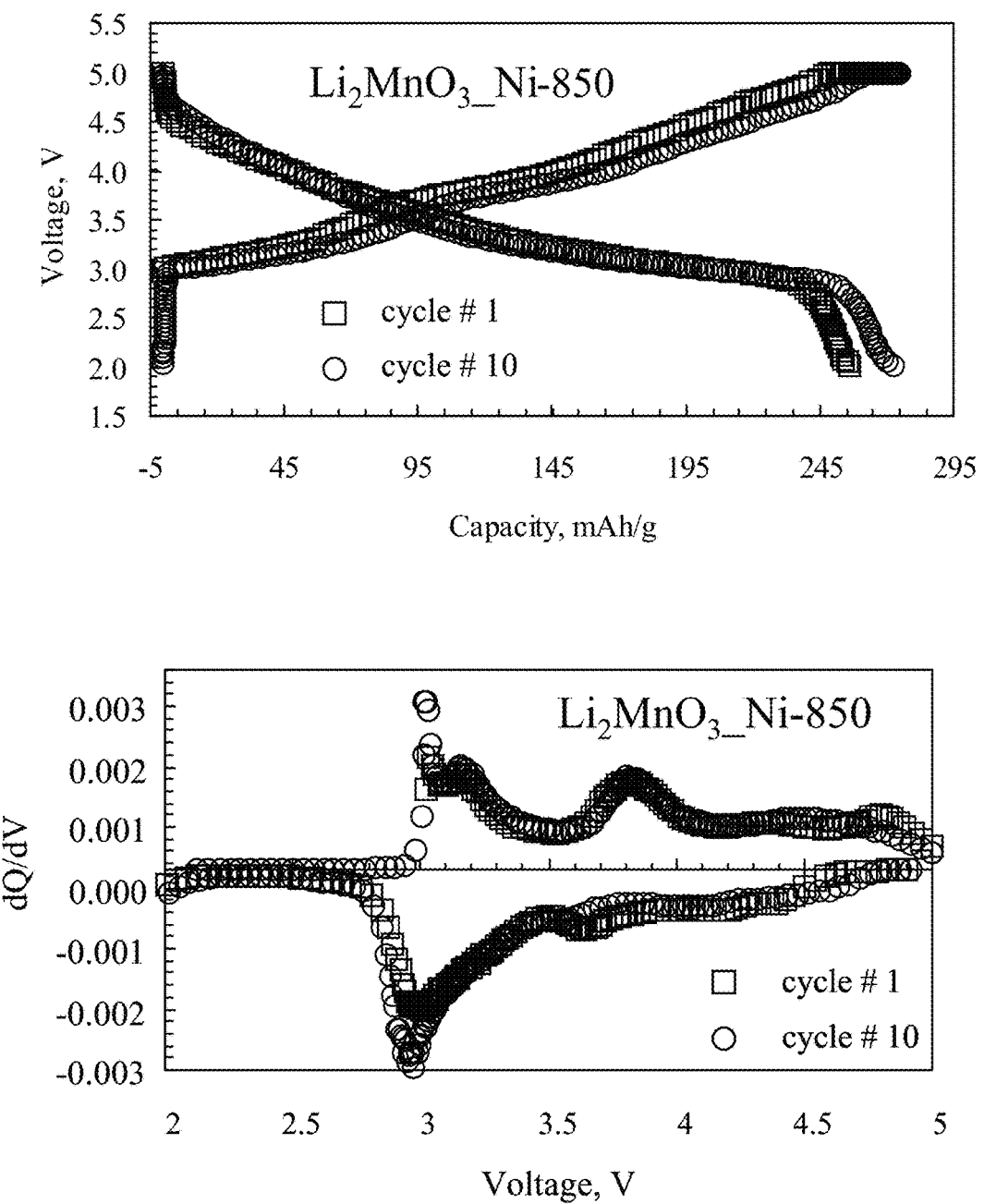
FIG. 7 depicts (top) electrochemical charge/discharge profiles between 2.0 and 5.0 V of a $Li/Li_2MnO_3$_Ni-850 cell after 50 cycles between 2.0 and 4.6 V, and (bottom) corresponding dQ/dV plots of the cell, in which the cathode is comprised of a Ni-containing $Li_2MnO_3$ product of this invention with a targeted composition $0.5Li_2MnO_3.0.5LiMn_{0.5}Ni_{0.5}O_2$.

FIG. 7 shows voltage profiles (top) and dQ/dV plots (bottom) for a $Li/Li_2MnO_3$_Ni-850 cell of the present invention with targeted composition $0.5Li_2MnO_3 0.5 LiMn_{0.5}Ni_{0.5}O_2$, when cycled between about 2.0 and 5.0 V after being subject first to 50 cycles between about 2.0 and 4.6 V. During these initial 50 cycles, a stable capacity of about 234 mAh/g was delivered by the cell with minimal change to the overall shape of the charge/discharge voltage profiles, indicating negligible conversion to spinel, despite the high Mn content in the composite electrode structure. Despite being charged a further 10 times at more extreme charging conditions (to about 5 V), the electrode yielded an unexpectedly high capacity of about 275 mAh/g with more than 99% coulombic efficiency with no significant changes in the dQ/dV plots during these 10 cycles. These surprising data therefore provide evidence of the strong, structural integrity of the cathode material, gained inherently from novel features in the structure and character of the electrode precursor and in the synthesis methods described in this invention. In particular, the results in FIG. 7 show remarkable capacity retention and minimal voltage decay, despite being continuously charged for ten cycles to 5.0 V at room temperature, emphasizing the novelty and advantages of the materials of this invention and the processes by which they are made.

Figure 8:
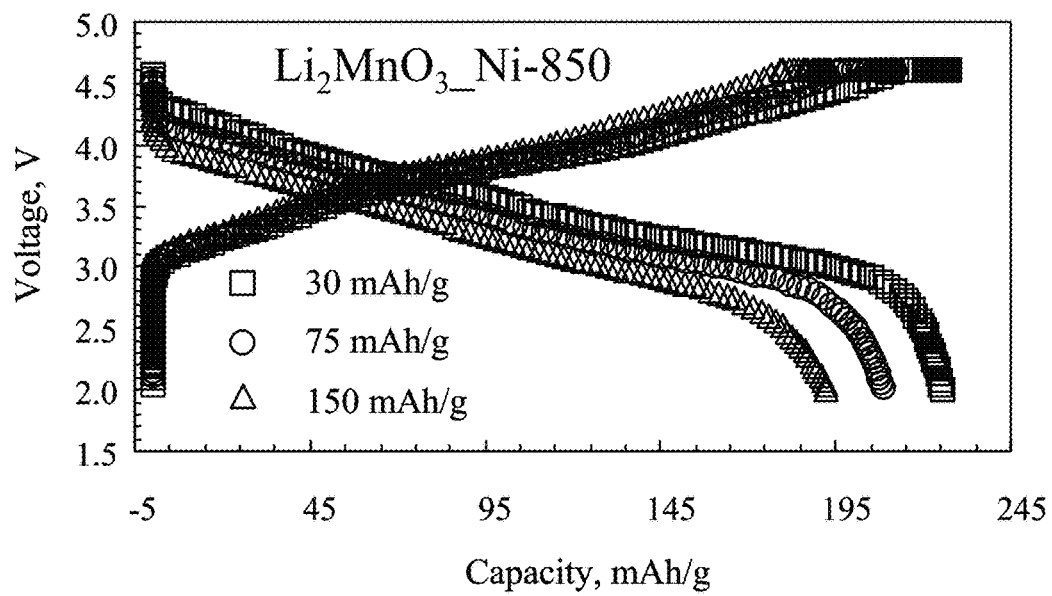
FIG. 8 depicts the rate capability a $Li/Li_2MnO_3$_Ni-850 cell when discharged between 4.6 and 2.0 V at various rates.

FIG. 8 shows the typical voltage profiles obtained at three different rates of discharge, 30 mA/g, 75 mA/g and 150 mA/g, from a $Li/Li_2MnO_3$_Ni-850 cell when cycled between about 4.6 and 2.0 V. At the highest rate, 150 mA/g, which corresponds approximately to a C/1.3 rate, the electrode delivered a capacity close to 200 mAh/g.

This example therefore emphasizes that the annealing step is crucial in controlling and tailoring the electrode structures of this invention and their electrochemical properties.

EXAMPLE 5

Figure 9:
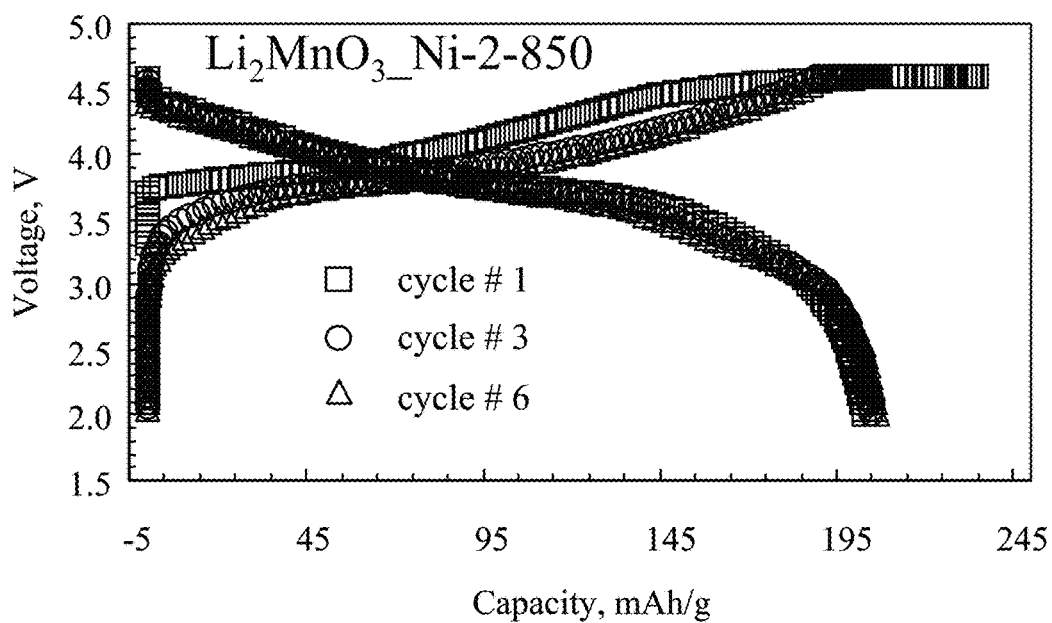
FIG. 9 depicts the electrochemical charge/discharge profiles of a $Li/Li_2MnO_3$_Ni-2-850 cell, in which the cathode is comprised of a Ni-containing $Li_2MnO_3$ product of this invention, with a targeted composition of $0.2Li_2MnO_3 \cdot 0.8 LiMn_{0.5}Ni_{0.5}O_2$.

Ni-containing $Li_2MnO_3$ powder was prepared as described above in Example 4 by adjusting the amount of Ni nitrate in the acidic solution to target a product with composition $0.2Li_2MnO_3.8LiMn_{0.5}Ni_{0.5}O_2$, i.e., the Li:Mn:Ni ratio in the $Li_2MnO_3$/nitric acid solution was about 1.20: 0.60:0.40. The product was annealed at about 850° C. prior to electrochemical evaluation in the lithium cell, and is labeled $Li_2MnO_3$_Ni-2-850. FIG. 9 shows voltage profiles of the $Li/Li_2MnO_3$_Ni-2-850 cell cycled between about 2.0 and 4.6 V. The cell delivers about 210 mAh/g at a C/14 rate with a first cycle efficiency of about 86%. The relatively high first cycle efficiency of this cell, as well as the high initial discharge capacity of the cathode (>200 mAh/g) demonstrates a significant advantage of electrodes of this invention and the method of preparing the electrodes from a $Li_2MnO_3$ precursor or a hydrogen-lithium-manganese-oxide precursor derived therefrom; the results from this example indicate that it should be possible to tailor the composition of $Li_2MnO_3$-stabilized composite electrode structures and to reduce significantly the first-cycle irreversible capacity loss incurred by the electrochemical activation process that typically occurs above 4.4 V.

EXAMPLE 6

$Li_2Mn_{0.9}Ti_{0.1}O_3$ was prepared by the following general procedure: $TiC_{12}H_{28}O_4$ (titanium isopropoxide) and $MnCO_3$ precursors were added to an aqueous solution of $LiOH.H_2O$ in the required stoichiometric amount and stirred for about 45 minutes to 1 hour. The liquid from the solution was evaporated at approximately 80° C., and a solid product was collected and ground to a powder. The powder was then annealed at about 450° C. for about 30 hours in air.

The $Li_2Mn_{0.9}Ti_{0.1}O_3$ precursor was then reacted with nickel nitrate in a 0.1 M solution of $HNO_3$ to target a product with composition $0.5Li_2Mn_{0.9}Ti_{0.1}O_3.0.5LiMn_{0.5}Ni_{0.5}O_2$, i.e., the Li:Mn:Ni:Ti ratio in the $Li_2MnO_3$/nitric acid solution was about 1.50:0.70:0.25:0.05, and stirred overnight at room temperature. The liquid from the solution was evaporated at approximately 70° C., and the resulting solid product was collected and ground to a powder. The powder was then annealed at about 45° C. for about 6 hours in air and labeled $Li_2Mn_{0.9}Ti_{0.1}O_3$_Ni.

Figure 10:
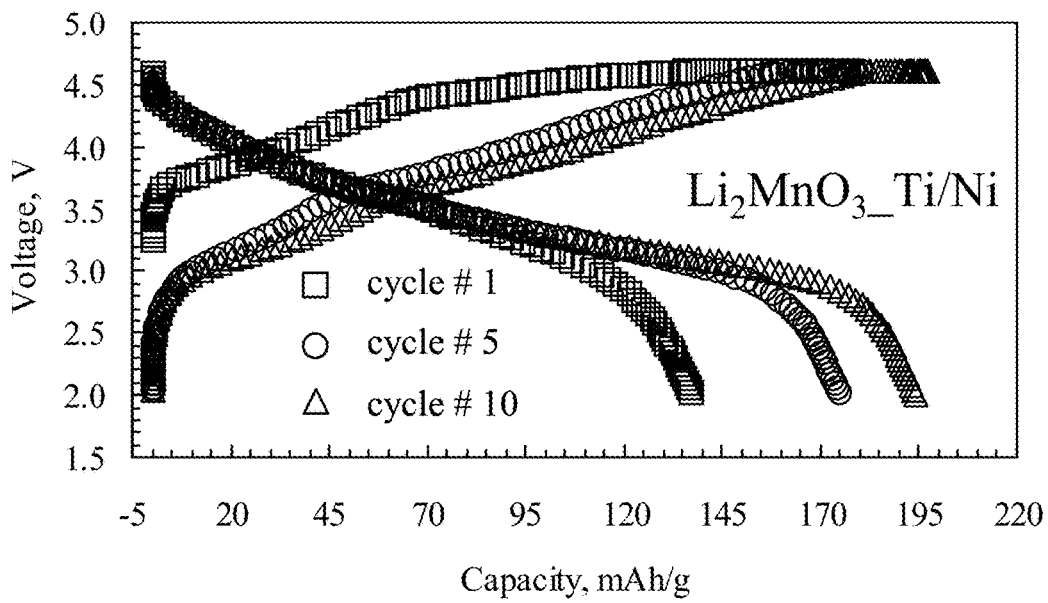
FIG. 10 depicts the electrochemical charge/discharge profiles of a $Li/Li_2MnO_3\_TiNi$ cell in which the cathode is comprised of a Ti- and Ni-containing $Li_2MnO_3$ product of this invention, with a targeted composition of $0.5Li_2Mn_{0.9}Ti_{0.1}O_3 \cdot 0.5LiMn_{0.5}Ni_{0.5}O_2$.

The voltage profiles of a $Li/Li_2Mn_{0.9}Ti_{0.1}O_3$_Ni cell are shown in FIG. 10. The capacity of the electrode increased from about 170 mAh/g to 200 mAh/g where it remained stable at greater than 99% efficiency on further cycling.

EXAMPLE 7

Figure 11:
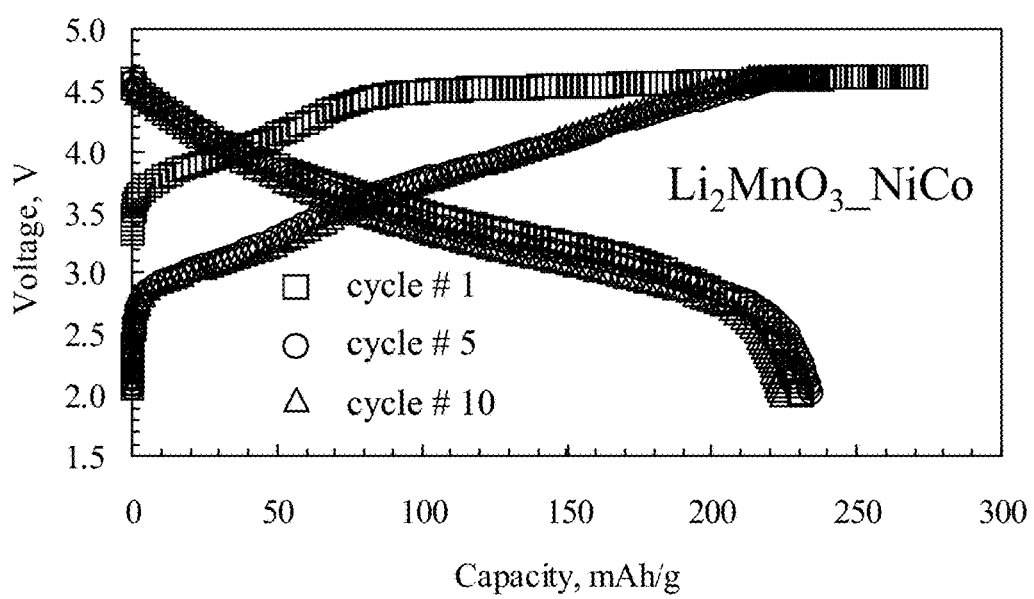
FIG. 11 depicts the electrochemical charge/discharge profiles of a $Li/Li_2MnO_3\_NiCo$ cell in which the cathode is comprised of a Ni- and Co-containing $Li_2MnO_3$ product of this invention, with a targeted composition of $0.5Li_2MnO_3 \cdot 0.5LiMn_{0.4}Co_{0.2}O_2$.

A Ni- and Co-containing $Li_2MnO_3$ powder was prepared as described above in Example 4 by adjusting the amount of Ni and Co nitrates in the acidic solution to target a product with composition $0.5Li_2MnO_3.0.5LiMn_{0.4}Co_{0.2}O_2$, i.e., the Li:Mn:Ni:Co ratio in the $Li_2MnO_3$/nitric acid solution was about 1.50:0.70:0.20:0.10. The product was annealed at about 450° C. prior to electrochemical evaluation in the lithium cell, and is labeled $Li_2MnO_3$_NiCo. FIG. 11 shows voltage profiles of the $Li/Li_2MnO_3$_NiCo cell cycled between about 2.0 and 4.6 V. The first cycle cycling efficiency was about 85% and more than 98% thereafter. The cell delivers over 220 mAh/g at a rate of about 15 mA/g for more than 10 cycles, demonstrating the utility of the invention.

EXAMPLE 8

The $Li_2MnO_3$ precursor of Example 4 was reacted with manganese acetate, $Mn(CH_3COO)_2.4H_2O$ in a 0.1 M solution of $HNO_3$ to target a 'layered-spinel' product with approximate composition $0.8Li_2MnO_3.0.2LiMn_2O_4$ using a Li:Mn ratio in the $Li_2MnO_3$/nitric acid solution of about 1.5:1.0, and stirred overnight at room temperature. The liquid from the solution was evaporated at approximately 70° C., and the resulting solid product was collected and ground to a powder. The powder was then annealed at about 450° C. for about 6 hours in air and labeled $Li_2MnO_3\_Mn$.

Figure 12:
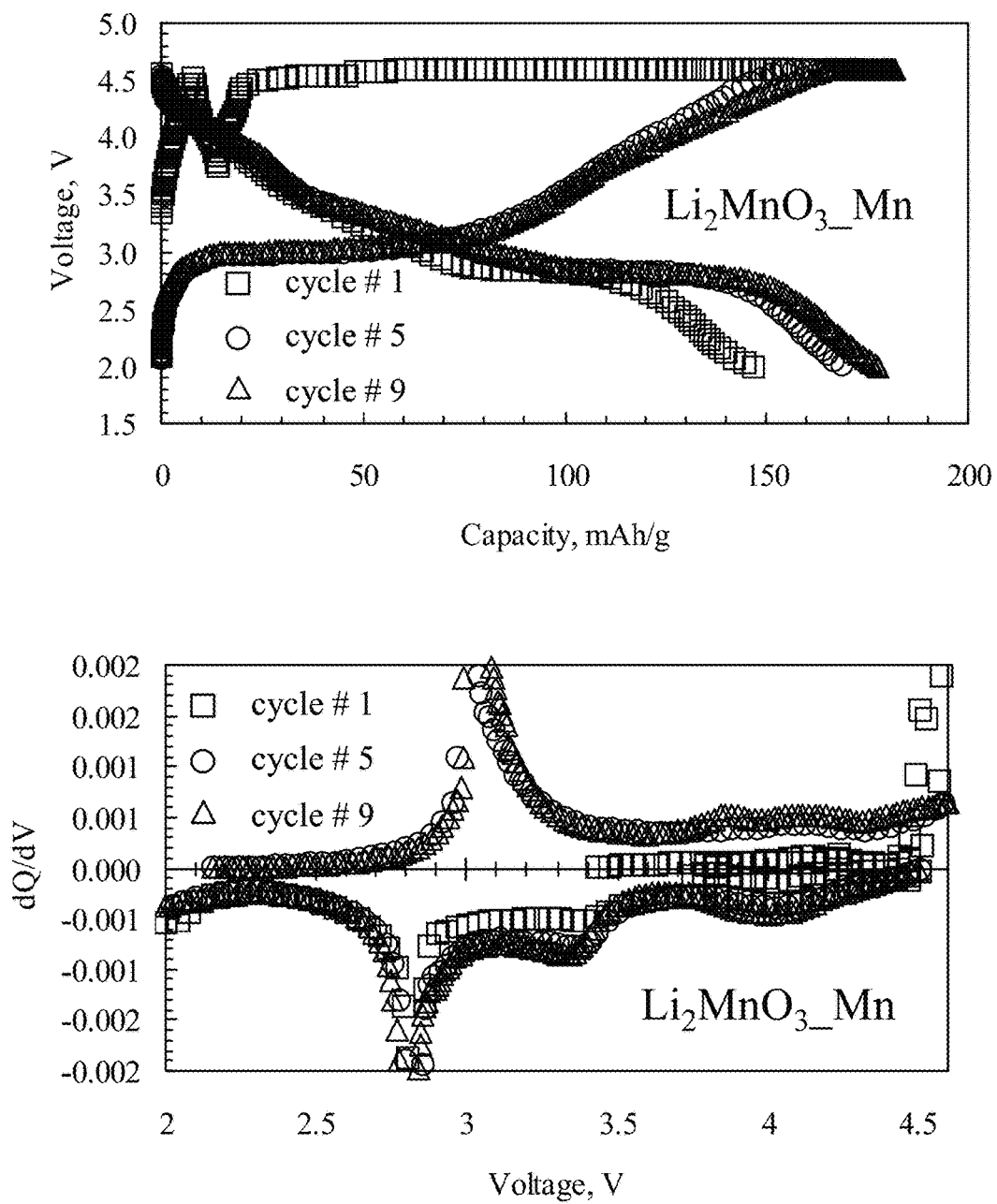
FIG. 12 depicts (top) electrochemical charge/discharge profiles between 2.0 and 4.6 V of a $Li/Li_2MnO_3\_Mn$ cell, and (bottom) corresponding dQ/dV plots of the cell, in which the cathode is comprised of a Mn-containing $Li_2MnO_3$ product of this invention with a targeted composition of $0.8Li_2MnO_3 \cdot 0.2LiMn_2O_4$.

The voltage profiles of a $Li/Li_2MnO_3\_Mn$ cell are shown in FIG. 12 (top), and corresponding dQ/dV plots in FIG. 12 (bottom). Cells were cycled between about 2.0 and 4.6 V. The voltage profile and dQ/dV plots are both consistent with the electrochemical behavior of a layered-spinel composite electrode structure, as evident from the electrochemical processes around 4 V and the flat voltage plateau at about 3 V, characteristic of the spinel component, and the steadily changing discharge voltage between about 3.7 V and about 3 V, which is characteristic of a layered component. The first cycle efficiency was about 94%, the discharge capacity and coulombic efficiency increasing on cycling from about 147 to 180 mAh/g and 94 to 98%, respectively, over the first 9 cycles, thereby demonstrating the utility of the invention.

EXAMPLE 9

Figure 13:
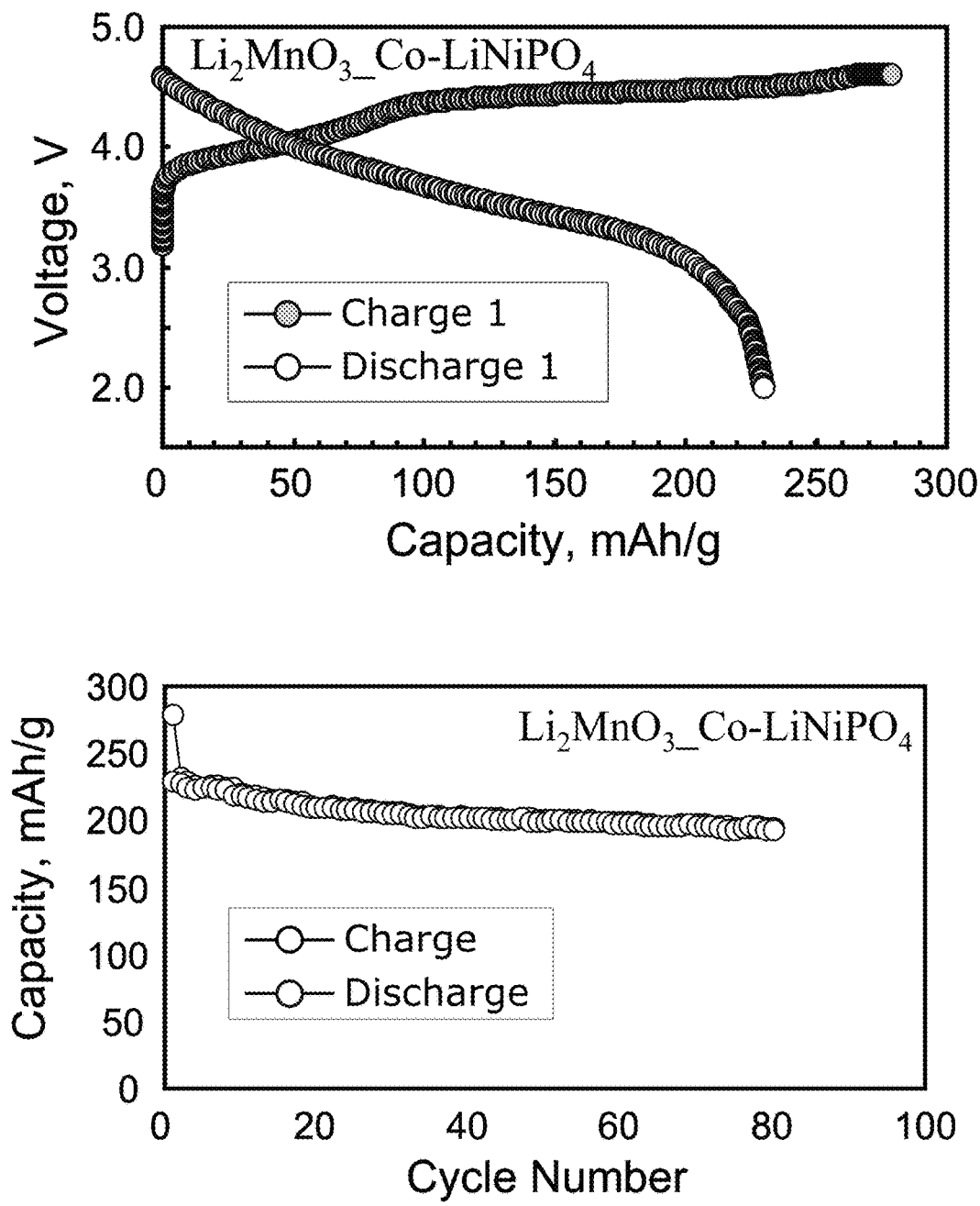
FIG. 13 depicts (top) the initial electrochemical charge/discharge profiles between 2.0 and 4.6 V of a $Li/Li_2MnO_3\_Co$—$LiNiPO_4$ cell, and (bottom) a capacity vs. cycle number plot of the same cell for 80 cycles.

A $Co_{0.5}Mn_{0.5}CO_3$ precursor was first prepared by reacting the required amounts of cobalt sulfate heptahydrate and manganese sulfate monohydrate in an aqueous solution of ammonium hydrogen carbonate to yield a $Co_{0.5}Mn_{0.5}CO_3$ precipitate that was subsequently dried overnight at about 100° C. $Li_2CO_3$ was then mechanically mixed with the dried $Co_{0.5}Mn_{0.5}CO_3$ precursor using a Li:Co:Mn ratio of about 1.5:0.5:0.5 before being annealed in air at 550° C. for 24 hours. The sample was subsequently cooled to room temperature before being heated at 850° C. for 12 hours to yield a product with the targeted composition $0.5Li_2MnO_3.0.5LiCoO_2$. Thereafter, the product was immersed in a coating solution consisting of ammonium dihydrogen phosphate, glycolic acid, nickel nitrate and lithium nitrate using a Li:Ni:P ratio of about 1:1:1 and a targeted Li—Ni—$PO_4$ mass of about 4 to 5% of the $0.5Li_2MnO_3.0.5LiCoO_2$ product, and then heated to dryness at approximately 60 to 70° C. The Li—Ni—$PO_4$ coated product was finally annealed at about 550° C. prior to electrochemical evaluation in the lithium cell, and is labeled $Li_2MnO\_Co\_LiNiPO_4$. FIG. 13 (top) shows the initial voltage profile of the $Li/Li_2MnO_3\_Co\_LiNiPO_4$ cell cycled between about 2.0 and 4.6 V, and FIG. 13 (bottom) the capacity vs. cycle number for the initial 80 cycles. The cycling efficiency was about 82% on the first cycle, about 100% after 40 cycles and about 99% after 80 cycles. The cell delivered more than 200 mAh/g after 40 cycles and more than 190 mAh/g after 80 cycles at a rate of about 15 mA/g.

Alternatively, a $Li_2MnO_3\_Co\_LiNiPO_4$ material of this invention can be prepared as follows: A Co-containing $Li_2MnO_3$ powder is prepared as described in Example 4 by adjusting the amount of cobalt nitrate in the acidic solution to target the composition $0.5Li_2MnO_3.0.5LiCoO_2$, i.e., the Li:Mn:Co ratio in the $Li_2MnO_3$/nitric acid solution is about 1.50:0.50:0.50. At the same time, a small amount of lithium nitrate, nickel nitrate and $NH_4(H_2)PO_4$ with a Li:Ni:P ratio of about 1:1:1, constituting about 4 to 5% of the mass of the targeted $0.5Li_2MnO_3.0.5LiCoO_2$ product is added to the starting solution to simultaneously participate in the reaction to form the phosphate-based coating on the product particles. The product is then annealed at about 550° C. prior to electrochemical evaluation in the lithium cell. Similarly, a $Li_2MnO_3\_Co\_Li_3PO_4$ or $Li_2MnO_3\_Co\_LiF$ electrode material can be prepared by adding the required amounts of $Li^+$, $PO_4^{3-}$ and $F^-$ ions to the starting solution. These processes demonstrate the utility of this invention and, in particular, that composite electrode materials with protective coating constituents can be manufactured in a single step by contacting a $Li_2MnO_3$ precursor with additional stabilizing metal cations and/or anions in an acidic solution, followed by (1) heat-treating the resulting product to form the powdered metal oxide composition; and (2) forming an electrode from the powdered metal oxide composition.

EXAMPLE 10

A $Li_2MnO_3$ product containing nickel with a targeted composition of $0.5Li_2MnO_3.0.5LiMn_{0.5}Ni_{0.5}O_2$ was prepared as in Example 4 above with the exception that an amount of $NH_4F$ was added to the solution, simultaneously with the Ni nitrate, so that the total amount of F in the final product was about 2.5 mol % with respect to all metals (i.e. Li, Mn, Ni). The dried powders were collected, ground, and annealed at 450° C. and 850° C. for 6 hours in air. Samples are labeled as $Li_2MnO_3\_NiF$-450 and $Li_2MnO_3\_NiF$-850, respectively.

Figure 14:
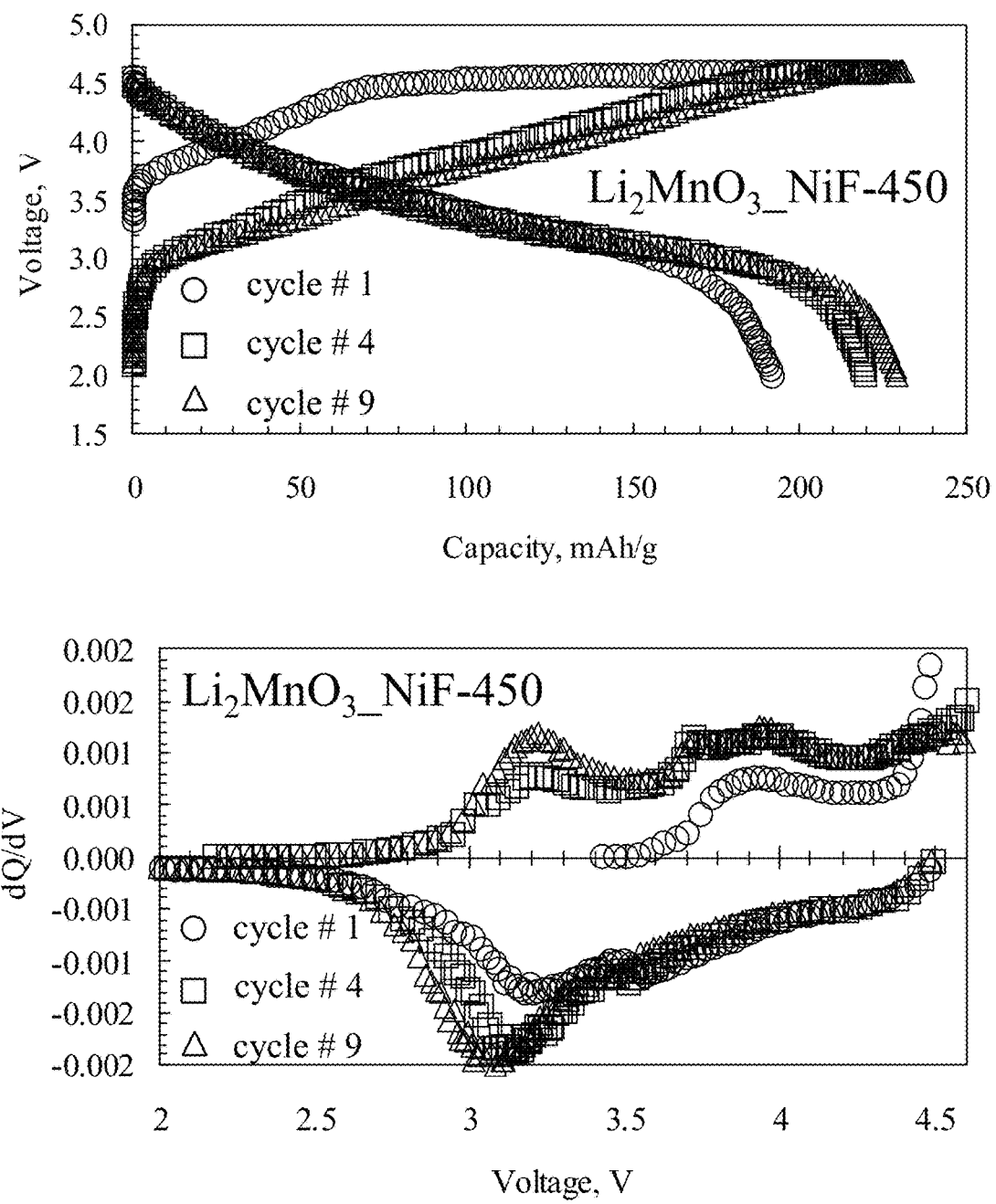
FIG. 14 depicts (top) the electrochemical charge/discharge profiles of a $Li/Li/Li_2MnO_3\_NiF$-450 cell in which the $Li_2MnO_3\_NiF$-450 cathode has a targeted fluorinated $0.5Li_2MnO_3 \cdot 0.5LiMn_{0.5}Ni_{0.5}O_2$ composition, and (bottom) corresponding dQ/dV plots of the cell.

The voltage profiles and corresponding dQ/dV plots of a $Li/Li_2MnO_3\_NiF$-450 cell for the $1^{st}$, $4^{th}$ and $9^{th}$ cycles are shown in FIG. 14, top and bottom panels, respectively. Cells were cycled between 2.0 and 4.6 V at a 15 mA/g rate. The first cycle efficiency of this cell was about 87% which is significantly higher than typically delivered by cells containing conventional $Li_2MnO_3$-based composite electrode structures. The 10-cycle average discharge capacity of the fluorinated $Li_2MnO_3\_NiF$-450 cathode was about 220 mAh/g.

Figure 15:
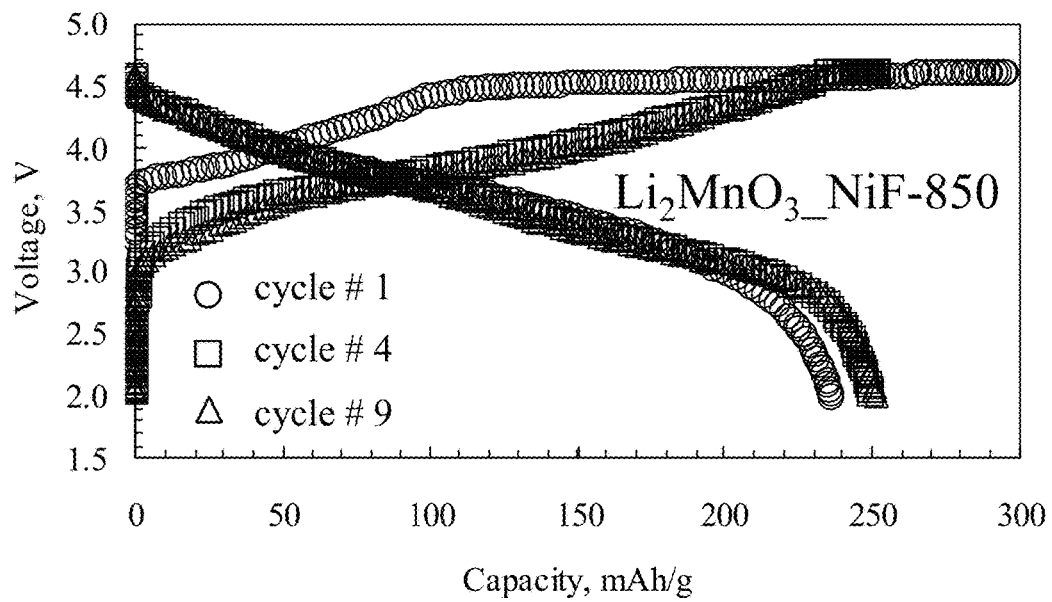
FIG. 15 depicts (top) the electrochemical charge/discharge profiles of a $Li/Li/Li_2MnO_3\_NiF$-850 cell in which the $Li_2MnO_3\_NiF$-850 cathode has a targeted fluorinated $0.5Li_2MnO_3 \cdot 0.5LiMn_{0.5}Ni_{0.5}O_2$ composition, and (bottom) corresponding dQ/dV plots of the cell.
Figure 15:
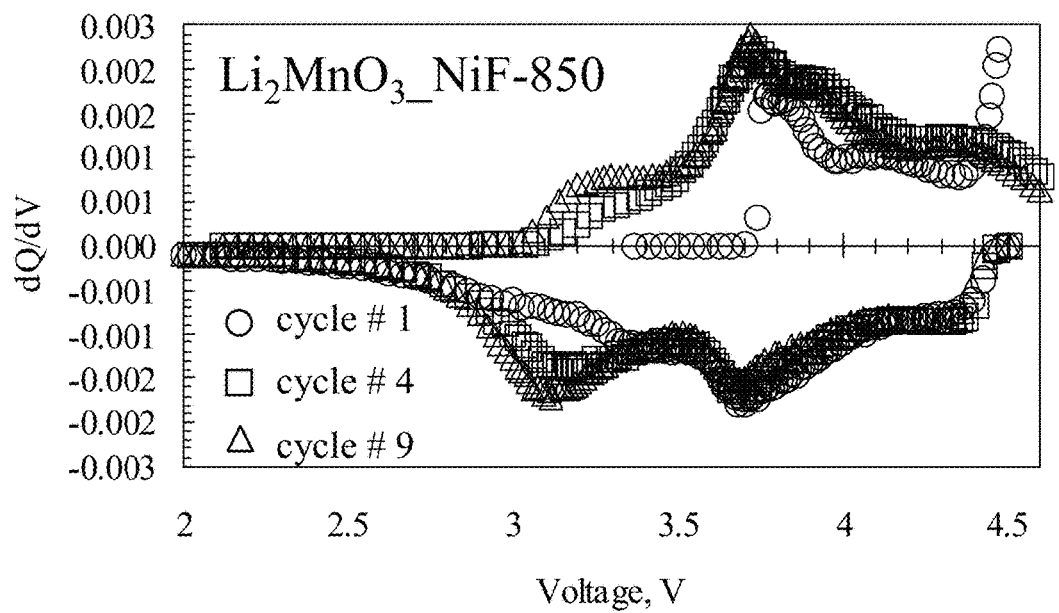

The voltage profiles and corresponding dQ/dV plots of a $Li/Li_2MnO_3\_NiF$-850 cell for the $1^{st}$, $4^{th}$, and 9th cycles are shown in FIG. 15. Cells were cycled between 2.0 and 4.6 V at a 15 mA/g rate. The first cycle efficiency of this cell was about 80% with a first cycle charge capacity of about 296 mAh/g and subsequent discharge capacity of about 236 mAh/g. The $Li_2MnO_3\_NiF$-850 cathode provided an average discharge capacity of about 248 mAh/g.

These observations, along with the excellent stability of the discharge process as demonstrated in particular by the dQ/dV data in FIG. 14 that shows a predominant discharge process slightly above 3 V, demonstrate the flexibility of the method of this invention in preparing high-capacity and stabilized cathode materials.

EXAMPLE 11

A precursor with a nominal composition of $Li_{1.95}Na_{0.05}MnO_3$ was prepared by the following general procedure: $MnCO_3$ and $Na_2CO_3$ were added to an aqueous solution of $LiOH.H_2O$ in the required stoichiometric amount and stirred for about 45 minutes to 1 hour. The liquid from the solution was evaporated at approximately 80° C., and a solid product was collected and ground to a powder. The powder was then annealed at about 450° C. for about 30 hours in air. Subsequently, a Ni containing product with a Ni:Mn ratio of 1:3 was prepared from the Na-containing Li$_2$MnO$_3$ precursor, as described in Example 4, and annealed at 850° C. in air for 6 hours. These samples are labeled as Li$_2$MnO$_3$_NaNi.

Figure 16:
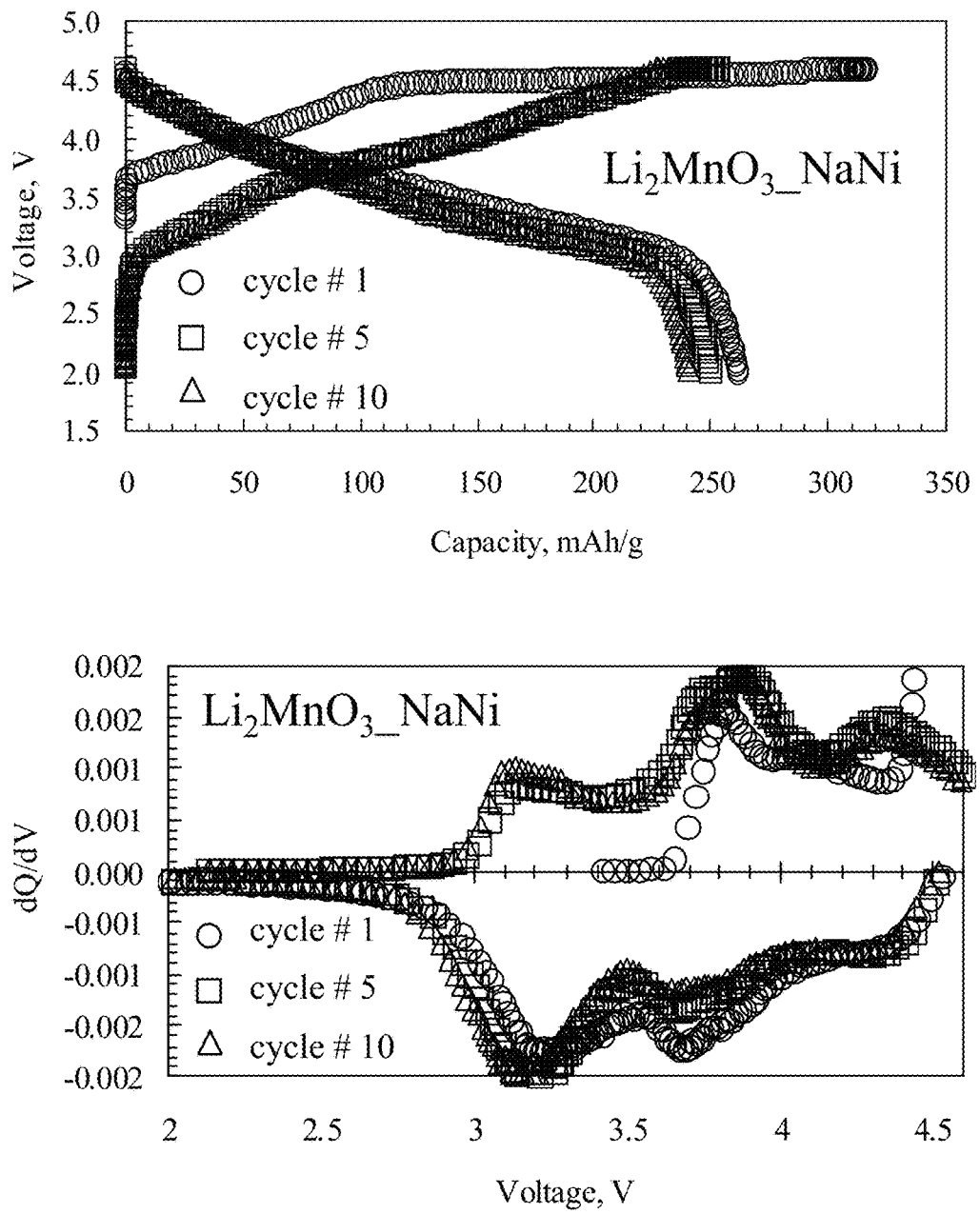
FIG. 16 depicts (top) the electrochemical charge/discharge profiles of a $Li/Li/Li_2MnO_3\_NaNi$ cell in which the $Li_2MnO_3\_NaNi$ cathode was derived by Ni incorporation into a $Li_{1.95}Na_{0.05}MnO_3$ precursor, and (bottom) corresponding dQ/dV plots of the cell.

FIG. 16 shows the voltage profiles of a Li/Li$_2$MnO$_3$_NaNi cell for the 1$^{st}$, 5$^{th}$ and 10$^{th}$ cycles. Cells were cycled between 2.0 and 4.6 V at a 15 mA/g rate. The first cycle efficiency was about 83%; the 10-cycle average discharge capacity of the Li$_2$MnO$_3$—NaNi cathode was about 250 mAh/g. This example also clearly demonstrates the utility of the preparation method in synthesizing high capacity and stable cathode materials of this invention.

EXAMPLE 12

A precursor with a nominal composition of Li$_{1-x}$Mg$_{x/2}$MnO$_3$ (x=0.05) was prepared as in Example 11 using stoichiometric amounts of MnCO$_3$ and Mg(NO$_3$)$_2$.6H$_2$O in an aqueous solution of LiOH.H$_2$O. The dried powder was ground and subsequently annealed at 450° C. in air for about 30 hours. A Ni containing product with a Ni:Mn ratio of 1:3 was prepared from the Mg-containing Li$_2$MnO$_3$ precursor, as described in Example 4, and annealed at 450° C. in air for 6 hours. Samples are labeled as Li$_2$MnO$_3$_MgNi (5%).

Figure 17:
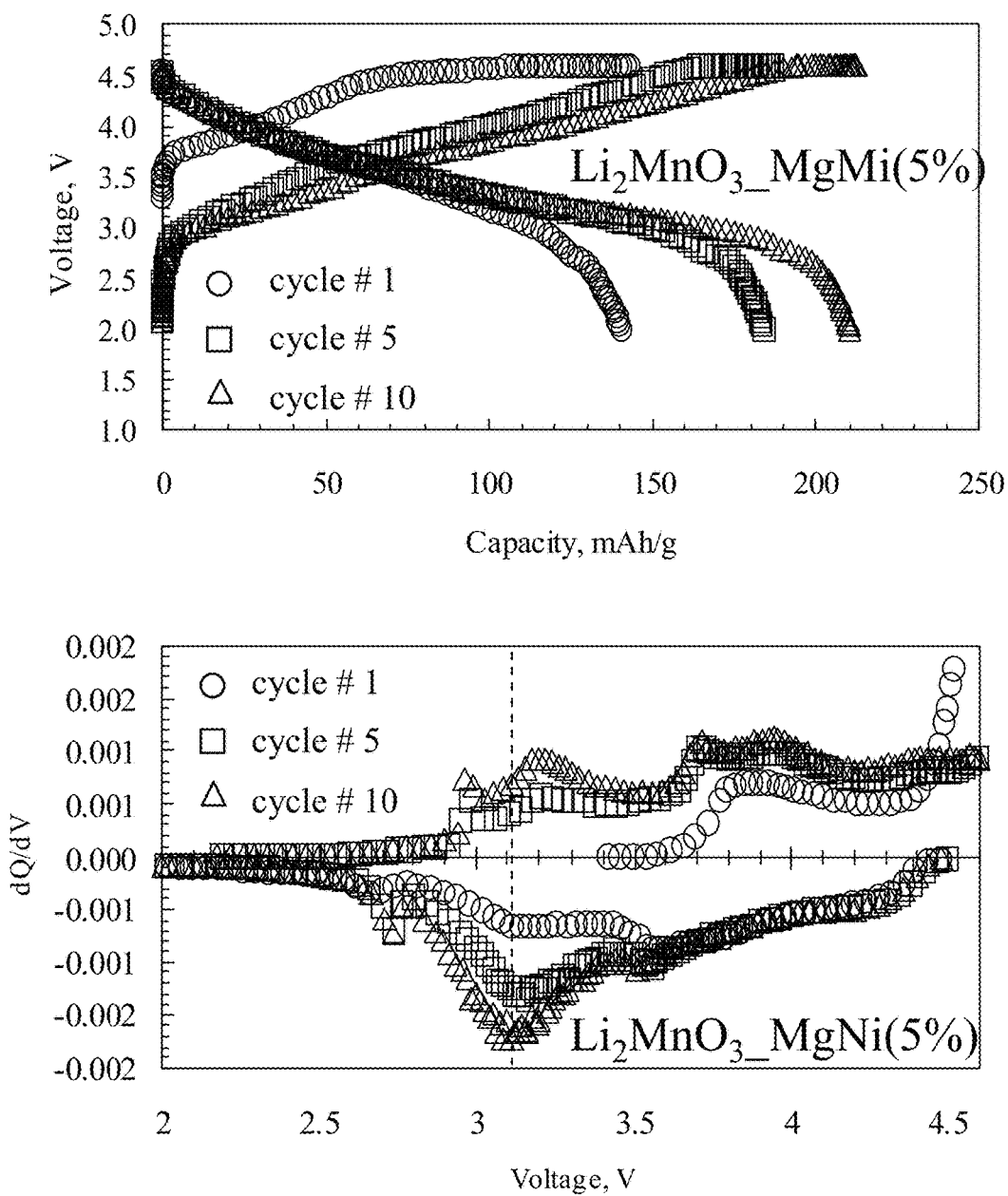
FIG. 17 depicts (top) the electrochemical charge/discharge profiles of a $Li/Li_2MnO_3\_MgNi$ (5%) cell in which the $Li_2MnO_3\_MgNi$ (5%) cathode was derived by Ni incorporation into a $Li_{1-x}Mg_{x/2}MnO_3$ (x=0.05) precursor, and (bottom) corresponding dQ/dV plots of the cell.

The top and bottom panels in FIG. 17 show the voltage profiles and corresponding dQ/dV plots, respectively, for the 1$^{st}$, 5$^{th}$ and 10$^{th}$ cycles of a Li/Li$_2$MnO$_3$_MgNi (5%) cell. Cells were cycled between 2.0 and 4.6 V at a 15 mA/g rate. The first cycle efficiency surprisingly was about 98% with the discharge capacity increasing to about 210 mAh/g after 10 cycles. Of additional significance is the stabilization of the discharge process at about 3.2V, as indicated by the dashed line in the dQ/dV plots of FIG. 17 (bottom panel).

EXAMPLE 13

The Li$_2$MnO$_3$ precursor, prepared as in Example 4, was reacted with stoichiometric amounts of Co nitrate and Ni nitrate to target a lithium-rich product having the approximate composition of Li$_{1.05}$Mn$_{0.52}$Ni$_{0.32}$Co$_{0.11}$O$_2$. The final, dried powder was annealed in air at 450° C. for 6 hours and is labeled as Li$_2$MnO$_3$_NiCo-2.

Figure 18:
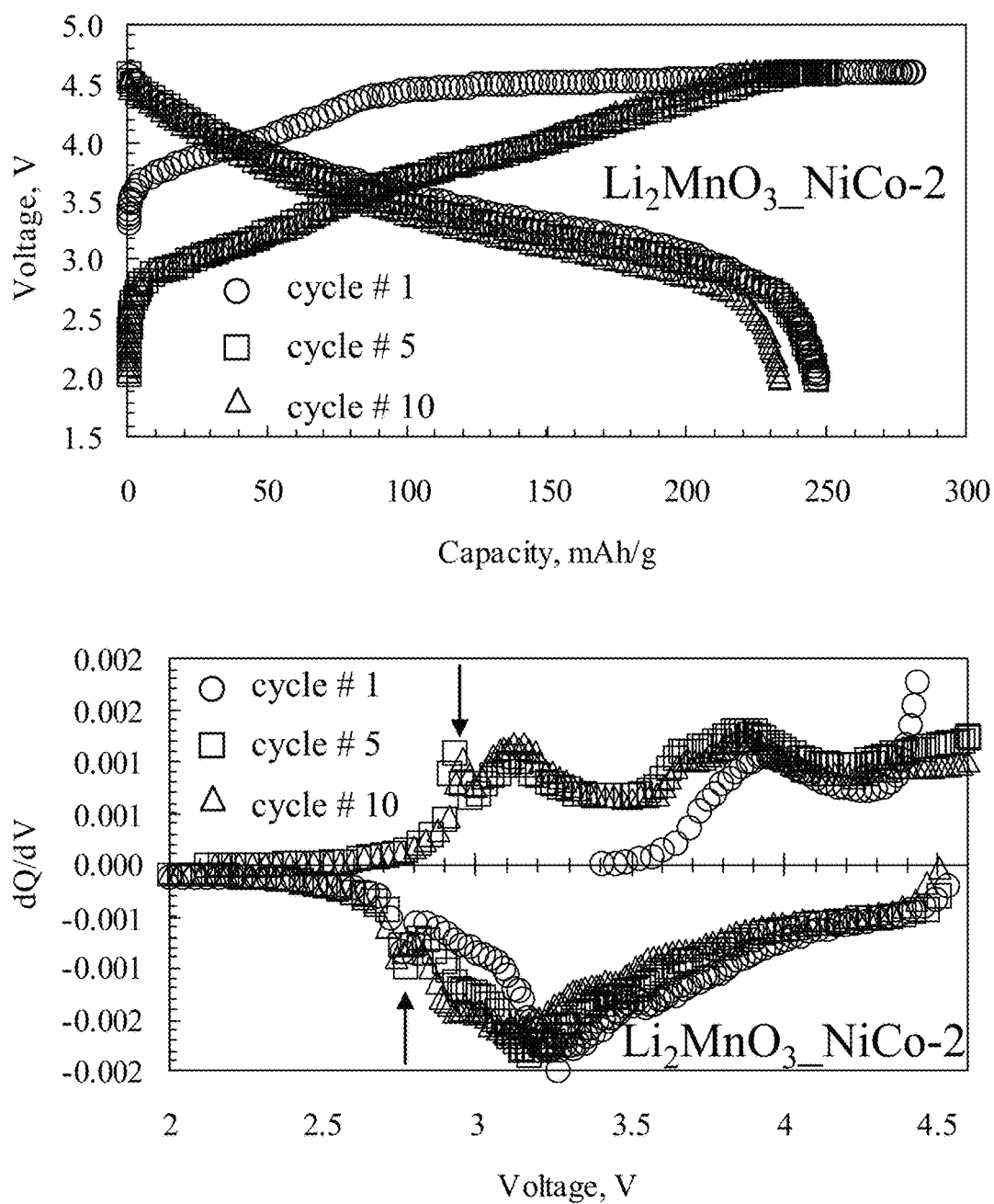
FIG. 18 depicts (top) the electrochemical charge/discharge profiles of a $Li/Li_2MnO_3\_NiCo$-2 cell in which the $Li_2MnO_3\_NiCo$-2 cathode had a targeted lithium-rich composition $Li_{1.05}Mn_{0.52}Ni_{0.32}Co_{0.11}O_2$ (in standard layered notation) and (bottom) corresponding dQ/dV plots of the cell.

FIG. 18 shows the voltage profiles of the 1$^{st}$, 5$^{th}$ and 10$^{th}$ cycles of a Li/Li$_2$MnO_NiCo-2 cell (top) and corresponding dQ/dV plots (bottom). Cells were cycled between 2.0 and 4.6 V at a 15 mA/g rate. The first cycle efficiency of this cell (about 88%) was excellent, with a first cycle charge capacity of about 281 mAh/g and subsequent discharge capacity of about 247 mAh/g. The 10-cycle average discharge capacity of the cathode was about 243 mAh/g. The dQ/dV plots for this cell (FIG. 18, bottom) revealed characteristic peaks of an evolving spinel phase on cycling as indicated by the arrowed peaks on charge and discharge, resulting in high capacity electrode products with 'layered-spinel' character.

This example is particularly noteworthy because it demonstrates a significantly lower first-cycle capacity loss (12%) compared to state-of-the-art composite electrode structures and compositions, such as the 38% first-cycle capacity loss of a 0.5Li$_2$MnO$_3$.0.5LiMn$_{0.33}$Ni$_{0.33}$Co$_{0.33}$O$_2$ electrode reported by Johnson et al. in Electrochemistry Communications, Volume 9, page 787 (2007). This improvement is particularly important because it illustrates that the materials of this invention can significantly minimize the extent of electrochemical activation above 4.5 V, thereby reducing surface damage to the electrode particles and enhancing electrochemical performance without compromising the exceptionally high capacities delivered by these composite electrodes relative to state-of-the art-electrode materials such as layered LiCoO$_2$, spinel LiMn$_2$O$_4$, and olivine LiFePO$_4$ and their analogues that typically provide capacities of about 160-170 mAh/g or lower.

EXAMPLE 14

The Li$_2$MnO$_3$ precursor was prepared as in Example 4 using stoichiometric amounts of MnCO$_3$ in an aqueous solution of LiOH.H$_2$O. The dried powder was ground and subsequently annealed at about 450° C. in air for about 30 hours. An Al containing product with a Ni:Mn ratio of 1:3 and total Al content of 2% by weight was prepared from a mixture of Ni nitrate and Al nitrate, similar to the procedure described in Example 4, and annealed at about 450° C. in air for about 6 hours; the target composition of this product was Li$_{1.16}$Mn$_{0.58}$Ni$_{0.19}$Al$_{0.06}$O$_2$ (in standard layered notation). This sample is labeled Li$_2$MnO$_3$_NiAl.

Figure 19:
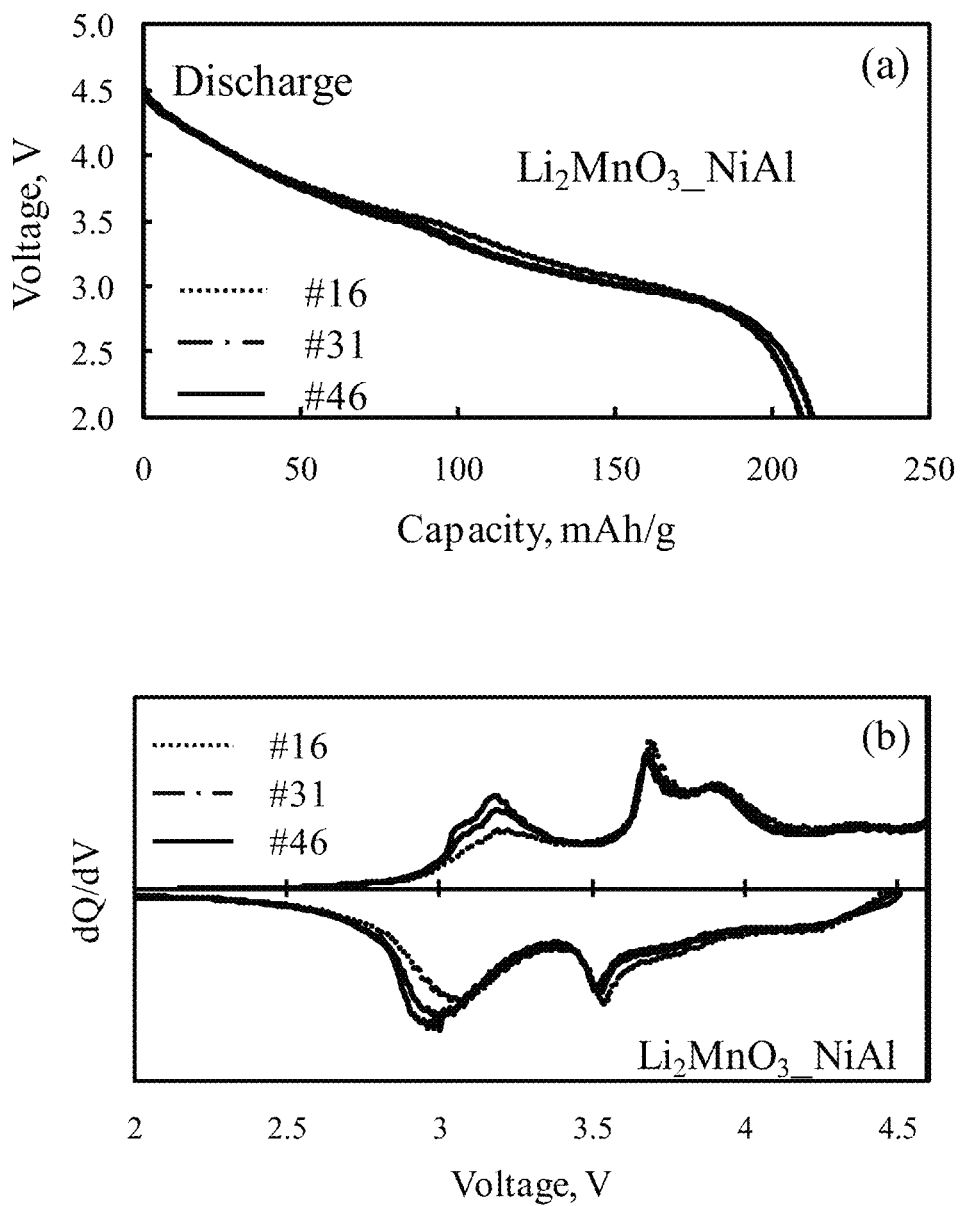
FIG. 19 depicts (a) the electrochemical charge/discharge profiles of a $Li/Li_2MnO_3\_NiAl$ cell in which the $Li_2MnO_3\_NiAl$ cathode had a targeted lithium-rich composition $Li_{1.16}Mn_{0.58}Ni_{0.19}Al_{0.06}O_2$ (in standard layered notation), and (b) corresponding dQ/dV plots of the cell.

FIGS. 19 (a) and (b) show the voltage profiles and the corresponding dQ/dV plots for a Li/Li$_2$MnO$_3$_NiAl cell. The first cycle efficiency was about 88% with the discharge capacity increasing on cycling to about 210 mAh/g; being then maintained for 50 cycles. This example confirms the utility of this invention and, in particular, the low first-cycle irreversible capacity loss and long-term cycling stability of Li$_2$MnO$_3$_NiAl composite electrodes.

EXAMPLE 15

Stoichiometrically required amounts of MnCO$_3$ and Li$_2$CO$_3$ were thoroughly mixed and annealed in air at about 450° C. for about 72 hours to prepare the Li$_2$MnO$_3$ precursor; this sample is labeled C—Li$_2$MnO$_3$. A Li$_2$MnO$_3$ product containing nickel with a targeted composition 0.5Li$_2$MnO$_3$.0.5LiMn$_{0.5}$Ni$_{0.5}$O$_2$, labeled C—Li$_2$MnO$_3$_Ni was prepared by the same procedure described in Example 4. FIG. 20(a) shows the typical voltage profiles of a Li/C—Li$_2$MnO$_3$_Ni cell when cycled between 4.6 and 2.0 V for cycles 31, 37 and 45. These data are comparable to, and are in good agreement with, those obtained for the Li/Li$_2$MnO$_3$_Ni_850 cell in FIG. 7 (top), which had been cycled under a wider voltage window (5.0 to 2.0 V). The discharge profiles in FIG. 20(a) represent the last 15 'break-in' cycles before the operating window was narrowed to 4.4-2.5 V. The average capacity delivered by the electrode between 4.6 and 2.0 V is exceptional, i.e., about 280 mAh/g. FIG. 20(b) shows the voltage profile of the cell when cycled over the narrower range (4.4-2.5 V) whereas FIG. 20(c) shows the corresponding dQ/dV plots for this cell. In this case, the delivered rechargeable capacity is reduced slightly to about 245 mAh/g. The data endorse the remarkably high rechargeable capacity and cycling stability of these composite electrode structures, when synthesized by the method of this invention. This example therefore reiterates the importance of using Li$_2$MnO$_3$ as a precursor and structural template for the synthesis of improved composite electrode structures and their electrochemical properties. Significant advantages of the invention include minimization of the electrochemical activation process, the suppression of the voltage decay phenomenon, enhanced cycling stability while delivering exceptionally high electrochemical capacities of about 245 mAh/g or more.

EXAMPLE 16

Figure 21:
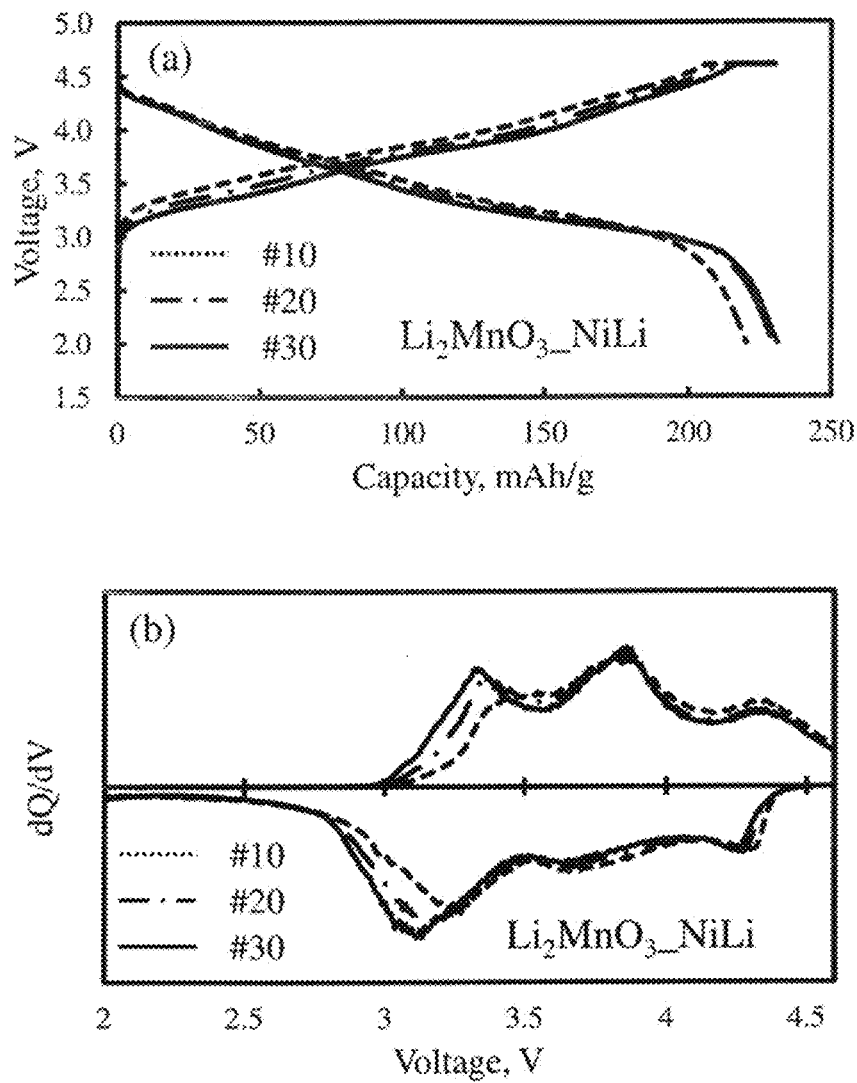
FIG. 21 depicts (a) the electrochemical charge/discharge profiles of a $Li/Li_2MnO_3\_NiLi$ cell in which the $Li_2MnO_3\_NiLi$ cathode had a targeted lithium-rich composition $0.5Li_2MnO_3 \cdot 0.5LiMn_{0.5}Ni_{0.5}O_2$ with an additional 10% lithium (with respect to the precursor $Li_2MnO_3$) included in the composite electrode product, and (b) corresponding dQ/dV plots of the cell.

A Li$_2$MnO$_3$ precursor was prepared as in Example 15 with carbonate precursors. A Li$_2$MnO$_3$ product 0.5Li$_2$MnO$_3$.0.5LiMn$_{0.5}$Ni$_{0.5}$O$_2$ containing about 10% excess lithium (with respect to the precursor Li$_2$MnO$_3$) was prepared following the procedure described in Example 4 to give a Li:Mn molar ratio in the final composite electrode product of about 2.13 and a Li:(Mn+Ni) molar ratio of about 1.6; the targeted composition of this example, in two-component notation, is therefore about 0.476Li$_2$MnO$_3$.0.524Li$_{1.09}$Mn$_{0.455}$Ni$_{0.455}$O$_2$; this sample is labeled Li$_2$MnO$_3$_NiLi. FIG. 21 (*a*) shows the typical voltage profiles of a Li/Li$_2$MnO$_3$_NiLi cell when cycled between 4.6 and 2.0 V for cycles 10, 20, and 30, and (*b*) corresponding dQ/dV plots of the cell. The average capacity delivered by the electrode between 4.6 and 2.0 V, after an initial 10 formation cycles, is approximately 230 mAh/g. The data show high rechargeable capacity and cycling stability on continued cycling over a wide voltage window (4.6-2.0 V). This example demonstrates the importance and versatility of using Li$_2$MnO$_3$ as a structural template for the synthesis of unique, composite structures with excellent electrochemical properties, particularly their cycling stability when charged at high voltages.

Electrochemical Cells and Batteries

Figure 22:
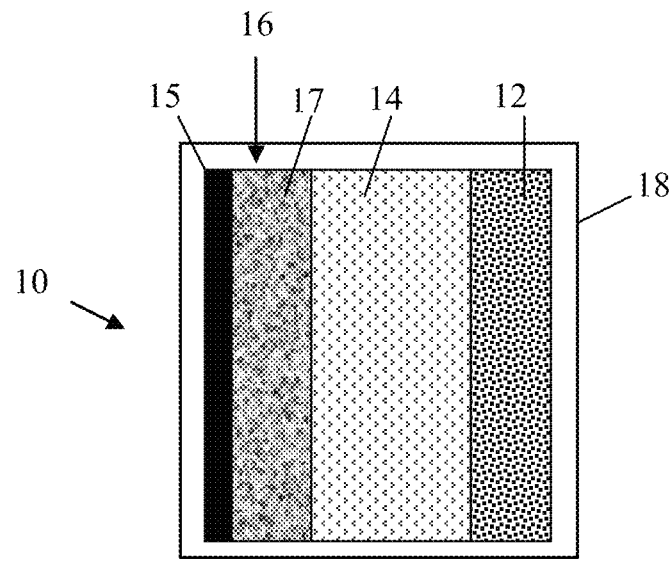
FIG. 22 depicts a schematic representation of an electrochemical cell.
Figure 23:
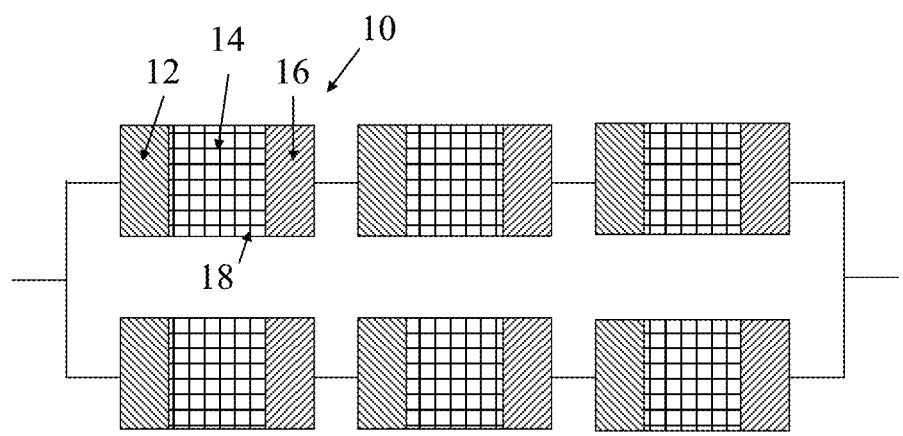
FIG. 23 depicts a schematic representation of a battery consisting of a plurality of cells connected electrically in series and in parallel.

A detailed schematic illustration of an electrochemical cell 10 of the invention is shown in FIG. 22. Cell 10 comprises negative electrode 12 separated from positive electrode 16 by an electrolyte 14, all contained in insulating housing 18 with suitable terminals (not shown) being provided in electronic contact with negative electrode 12 and positive electrode 16 of the invention. Positive electrode 16 comprises metallic collector plate 15 and active layer 17 comprising the metal-inserted hydrogen-lithium-manganese-oxide material as described herein. Binders and other materials, such as carbon, normally associated with both the electrolyte and the negative and positive electrodes are well known in the art and are not described herein, but are included as is understood by those of ordinary skill in this art. FIG. 23 provides a schematic illustration of one example of a battery in which two strings of electrochemical sodium cells 10, described above, are arranged in parallel, each string comprising three cells 10 arranged in series.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A method of preparing a positive electrode for an electrochemical cell, the method comprising the steps of:
    (a) contacting a precursor compound comprising lithium and manganese metal ions with an aqueous acidic solution containing one or more other metal ions to form a hydrogen-lithium-manganese-oxide and concurrently to insert the one or more other metal ions into the hydrogen-lithium-manganese-oxide to form an oxide intermediate therefrom;
    (b) heating the oxide intermediate from step (a) at a temperature in the range of about 300 to about 1000° C. to form a powdered metal oxide product; and
    (c) forming an electrode from the powdered metal oxide product;
    wherein the powdered metal oxide product has an integrated structure comprising a combination of two or more crystal structures selected from a layered crystal structure, a spinel crystal structure, and a rocksalt crystal structure, and wherein the precursor compound comprises lithium, manganese, and oxygen ions in a layered-type structure wherein lithium ions occupy octahedral sites in lithium-containing layers, and the lithium and manganese ions occupy octahedral sites in manganese-containing layers that alternate with the lithium-containing layers; and wherein the metal ions in the acidic solution consist of one or more metal ions are selected from the group consisting of an alkali metal ion, an alkaline earth metal ion, a transition metal ion, and an aluminum ion.

2. The method of claim 1 wherein the precursor compound comprises Li$_2$MnO$_3$ or Li[Li$_{1/3}$Mn$_{2/3}$]O$_2$, and optionally includes up to 25 atom percent of one or more metal ions other than Li and Mn.

3. The method of claim 2 wherein the one or more metal ions other than Li and Mn comprises a Ti ion, a Zr ion, a Co ion, a Ni ion, or a combination thereof.

4. The method of claim 1 wherein the aqueous acidic solution also includes one or more metalloid-containing ions, non-metal containing ions, or a combination thereof.

5. The method of claim 1 wherein the one or more other metal ions in the aqueous acidic solution comprises at least one alkali metal ion selected from the group consisting of a Li ion, a Na ion and a K ion.

6. The method of claim 1 wherein the one or more other metal ions in the aqueous acidic solution comprises at least one alkaline earth metal ion selected from the group consisting of a Mg ion and a Ca ion.

7. The method of claim 1 wherein the one or more other metal ions in the aqueous acidic solution comprises at least one transition metal ion selected from the group consisting of a Ti ion, a V ion, a Mn ion, a Fe ion, a Co ion, a Ni ion, a Zr ion, and a Mo ion.

8. The method of claim 1 wherein the electrode contains cation or anion defects and/or stacking faults and dislocations.

9. The method of claim 1 wherein the precursor compound is prepared by the reaction of one or more lithium salts, one or more manganese salts, and optionally one or more other metal salts at a temperature in the range of about 450 to about 550° C. in air.

10. The method of claim 9 wherein the lithium salts, manganese salts and other metal salts are selected from the group consisting of carbonates, hydroxides, nitrates, and isopropoxides.

11. The method of claim 1 wherein the heating in step (b) is at a temperature in the range of about 400 to about 950° C.

12. The method of claim 1 wherein the hydrogen-lithium-manganese-oxide material comprises hydrogen, lithium, manganese, and oxygen ions, and the oxygen ions are arranged in alternating layers of octahedra and trigonal prisms in the crystal structure of the material.

13. The method of claim 1 further comprising applying to a surface of the electrode, the individual particles of the powdered metal oxide composition, or both, a coating of at least one material selected from the group consisting of a metal oxide, a metal fluoride, and a metal polyanionic material.

14. The method of claim 13 wherein the coating comprises at least one material selected from the group consisting of (a) lithium fluoride, (b) aluminum fluoride, (c) a lithium-metal-oxide in which the metal is selected from the group consisting of Al and Zr, (d) a lithium-metal-phosphate in which the metal is selected from the group consisting of Fe, Mn, Co, and Ni, and (e) a lithium-metal-silicate comprising a metal selected from the group comprising Al and Zr.

15. The method of claim 1 wherein the hydrogen-lithium-manganese-oxide material, prior to treatment with the acidic solution, also includes up to 25 atom percent of one or more other transition metal ions replacing manganese ions, lithium ions, or a combination thereof in a manganese-containing layer of the material.

16. The method of claim 15 wherein the one or more other transition metal ions comprises a Ti ion, a Zr ion, a Co ion, a Ni ion, or a combination thereof.

* * * * *